United States Patent
Huang et al.

(10) Patent No.: US 10,993,141 B2
(45) Date of Patent: Apr. 27, 2021

(54) METHOD AND APPARATUS FOR HANDLING SIDELINK AND UPLINK HARQ-ACK FEEDBACK IN A WIRELESS COMMUNICATION SYSTEM

(71) Applicant: ASUSTek Computer Inc., Taipei (TW)

(72) Inventors: Chun-Wei Huang, Taipei (TW); Ming-Che Li, Taipei (TW)

(73) Assignee: ASUSTek Computer Inc., Taipei (TW)

( * ) Notice: Subject to any disclaimer, the term of this patent is extended or adjusted under 35 U.S.C. 154(b) by 0 days.

(21) Appl. No.: 16/796,665

(22) Filed: Feb. 20, 2020

(65) Prior Publication Data
US 2020/0267597 A1 Aug. 20, 2020

Related U.S. Application Data

(60) Provisional application No. 62/808,019, filed on Feb. 20, 2019.

(51) Int. Cl.
*H04W 12/00* (2021.01)
*H04W 28/04* (2009.01)
(Continued)

(52) U.S. Cl.
CPC ........... *H04W 28/04* (2013.01); *H04L 1/1812* (2013.01); *H04W 72/1263* (2013.01); *H04W 72/1289* (2013.01)

(58) Field of Classification Search
None
See application file for complete search history.

(56) References Cited

U.S. PATENT DOCUMENTS

| | | | |
|---|---|---|---|
| 2014/0269338 A1* | 9/2014 | Jung | H04L 5/0055 370/241 |
| 2019/0052436 A1* | 2/2019 | Desai | H04L 1/18 |
| 2019/0342035 A1* | 11/2019 | Zhang | H04L 1/1607 |

FOREIGN PATENT DOCUMENTS

WO 2014071304 A1 5/2014

OTHER PUBLICATIONS

Fujitsu: "Discussion on HARQ-ACK feedback for NR-V2X", Jan. 2019; 3GPP TSG RAN WG1 Ad-Hoc Meeting 1901, R1-1900248; 3rd Generation Partnership Project (3GPP); Mobile Competence Centre; 650, Route Des Lucioles; vol. RAN WGI, No. Taipei, Taiwan; Retrieved from the Internet: URL:http://www.3gpp.org/ftp/Meetings%5F3GPP%5FSYNC/RAN1/Docs/R1%2D1900248%2Ezip; 8 pgs.

(Continued)

*Primary Examiner* — Noel R Beharry
*Assistant Examiner* — Lionel Preval
(74) *Attorney, Agent, or Firm* — Cooper Legal Group, LLC

(57) ABSTRACT

A method and apparatus are disclosed. In an example from the perspective of a first device, the first device is configured with a second set of slot offsets by a network. The first device receives, from the network, a second Downlink Control Information (DCI) scheduling a sidelink resource. The first device performs sidelink transmission, to a second device, on the sidelink resource. The first device monitors and/or receives a sidelink hybrid automatic repeat request-acknowledgement (SL HARQ-ACK) feedback from the second device in a fourth slot. The SL HARQ-ACK feedback is associated with the sidelink transmission. The first device derives, based on the fourth slot and a second slot offset value indicated by the second DCI, a third slot for transmitting a SL HARQ-ACK to the network. The second set of slot offsets includes the second slot offset value. The (Continued)

SL HARQ-ACK is set/derived/determined based on the received SL HARQ-ACK feedback.

27 Claims, 12 Drawing Sheets

(51) Int. Cl.
    *H04L 1/18*         (2006.01)
    *H04W 72/12*      (2009.01)

(56) References Cited

OTHER PUBLICATIONS

Vivo: "Enancements of Uu Link to Control Sidelink"; Mar. 2019; 3GPP TSG RAM WG1 #96; R1-1901688; 3rd Generation Partnership Project (3GG); Mobile Competence Centre; 650, Route Des Lucioles; vol. RAN WG1, Athens, Greece; Retrieved from the Internet: URL:http://www.3gpp.org/ftp/tsg%5Fran/WG1%5FRL1/TSGR1%5F96/Docs/R1%2D1901688%2Ezip; 8 pgs.
Corresponding Indian Patent Application No. 202014007264, Office Action dated Sep. 21, 2020. English Translation.

* cited by examiner

| Uu \ SL | 0 | 1 | (1,X) |
|---|---|---|---|
| 0 | No PUCCH | 1 bit | 12 bits |
| 1 | 1 bit | 12 bits | 12 bits |
| (1,Y) | 12 bits | 12 bits | 12 bits |

| Uu \ SL | 0 | 1 | (1,X] |
|---|---|---|---|
| 0 | No PUCCH | 1 bit | 8 bits |
| 1 | 1 bit | 2 bits | 9 bits |
| (1,Y] | 4 bits | 5 bits | 12 bits |

| Uu \ SL | 0 | 1 | (1,X] |
|---|---|---|---|
| 0 | No PUCCH | 2 bits | 12 bits |
| 1 | 2 bits | 2 bits | 12 bits |
| (1,Y] | 12 bits | 12 bits | 12 bits |

FIG. 12

METHOD AND APPARATUS FOR HANDLING SIDELINK AND UPLINK HARQ-ACK FEEDBACK IN A WIRELESS COMMUNICATION SYSTEM

CROSS-REFERENCE TO RELATED APPLICATIONS

The present application claims the benefit of U.S. Provisional Patent Application Ser. No. 62/808,019 filed on Feb. 20, 2019, the entire disclosure of which is incorporated herein in its entirety by reference.

FIELD

This disclosure generally relates to wireless communication networks, and more particularly, to a method and apparatus for handling sidelink and uplink hybrid automatic repeat request-acknowledgement (HARQ-ACK) in a wireless communication system.

BACKGROUND

With the rapid rise in demand for communication of large amounts of data to and from mobile communication devices, traditional mobile voice communication networks are evolving into networks that communicate with Internet Protocol (IP) data packets. Such IP data packet communication can provide users of mobile communication devices with voice over IP, multimedia, multicast and on-demand communication services.

An exemplary network structure is an Evolved Universal Terrestrial Radio Access Network (E-UTRAN). The E-UTRAN system can provide high data throughput in order to realize the above-noted voice over IP and multimedia services. A new radio technology for the next generation (e.g., 5G) is currently being discussed by the 3GPP standards organization. Accordingly, changes to the current body of 3GPP standard are currently being submitted and considered to evolve and finalize the 3GPP standard.

SUMMARY

In accordance with the present disclosure, one or more devices and/or methods are provided. In an example from the perspective of a first device, the first device is configured with a second set of slot offsets by a network. The first device receives, from the network, a second Downlink Control Information (DCI) scheduling a sidelink resource. The first device performs sidelink transmission, to a second device, on the sidelink resource. The first device monitors and/or receives a sidelink hybrid automatic repeat request-acknowledgement (SL HARQ-ACK) feedback from the second device in a fourth slot. The SL HARQ-ACK feedback is associated with the sidelink transmission. The first device derives, based on the fourth slot and a second slot offset value indicated by the second DCI, a third slot for transmitting a SL HARQ-ACK to the network. The second set of slot offsets comprises the second slot offset value. The SL HARQ-ACK is set/derived/determined based on the received SL HARQ-ACK feedback.

BRIEF DESCRIPTION OF THE DRAWINGS

FIG. 8 is a table comprising Uplink Control Information (UCI) payload sizes according to one exemplary embodiment.

FIG. 11 is a table comprising UCI payload sizes according to one exemplary embodiment.

FIG. 12 is a table comprising UCI payload sizes according to one exemplary embodiment.

DETAILED DESCRIPTION

The exemplary wireless communication systems and devices described below employ a wireless communication system, supporting a broadcast service. Wireless communication systems are widely deployed to provide various types of communication such as voice, data, and so on. These systems may be based on code division multiple access (CDMA), time division multiple access (TDMA), orthogonal frequency division multiple access (OFDMA), $3^{rd}$ Generation Partnership Project (3GPP) LTE (Long Term Evolution) wireless access, 3GPP LTE-A or LTE-Advanced (Long Term Evolution Advanced), 3GPP2 UMB (Ultra Mobile Broadband), WiMax, or some other modulation techniques.

In particular, the exemplary wireless communication systems devices described below may be designed to support one or more standards such as the standard offered by a consortium named "3rd Generation Partnership Project" referred to herein as 3GPP, including: 3GPP TS 36.213 V15.3.0 (2018-09), "E-UTRA; Physical layer procedures (Release 15)"; 3GPP TS 36.212 V15.2.1 (2018-07), "E-UTRA); Physical layer; Multiplexing and channel coding (Release 15)"; 3GPP TS 36.211 V15.2.0 (2018-06), "E-UTRA); Physical layer; Physical channels and modulation (Release 15)"; R1-1810051, Final Report of 3GPP TSG RAN WG1 #94 v1.0.0 (Gothenburg, Sweden, 20-24 Aug. 2018); R1-1812101, Final Report of 3GPP TSG RAN WG1 #94bis v1.0.0 (Chengdu, China, 8-12 Oct. 2018); Draft Report of 3GPP TSG RAN WG1 #95 v0.1.0 (Spokane, USA, 12-16 Nov. 2018); Draft Report of 3GPP TSG RAN WG1 #AH_1901 v0.1.0 (Taipei, Taiwan, 21-25 Jan. 2019);

RP-182111, "Revised SID: Study on NR V2X", LG Electronics; 3GPP TS 38.213 V15.4.0 (2018-12), "NR; Physical layer procedures for control (Release 15)". The standards and documents listed above are hereby expressly incorporated by reference in their entirety.

Figure 1:
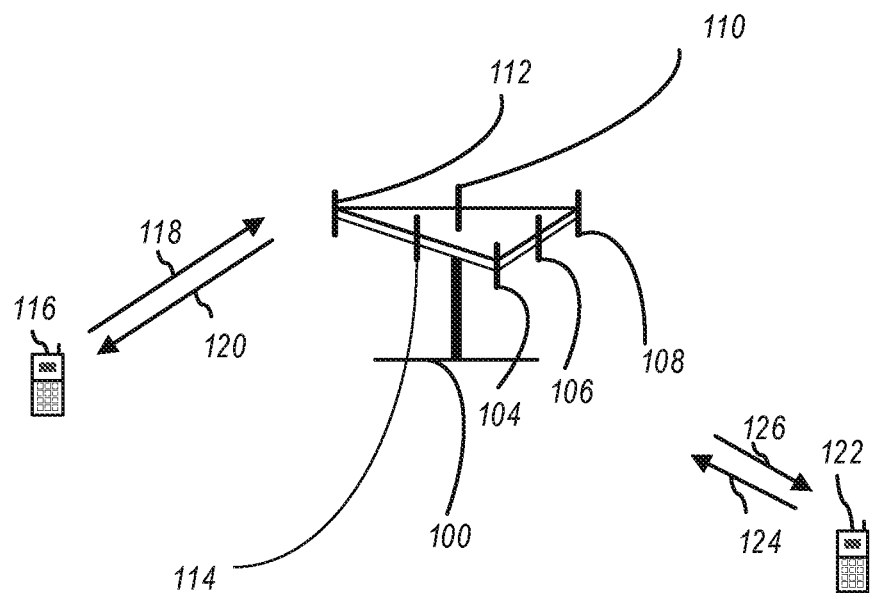
FIG. 1 shows a diagram of a wireless communication system according to one exemplary embodiment.

FIG. 1 presents a multiple access wireless communication system in accordance with one or more embodiments of the disclosure. An access network 100 (AN) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. AT 122 is in communication with antennas 106 and 108, where antennas 106 and 108 transmit information to AT 122 over forward link 126 and receive information from AT 122 over reverse link 124. In a frequency-division duplexing (FDD) system, communication links 118, 120, 124 and 126 may use different frequencies for communication. For example, forward link 120 may use a different frequency from that used by reverse link 118.

Each group of antennas and/or the area in which they are designed to communicate is often referred to as a sector of the access network. In the embodiment, antenna groups each may be designed to communicate to access terminals in a sector of the areas covered by access network 100.

In communication over forward links 120 and 126, the transmitting antennas of access network 100 may utilize beamforming in order to improve the signal-to-noise ratio of forward links for the different access terminals 116 and 122. Also, an access network using beamforming to transmit to access terminals scattered randomly through its coverage may normally cause less interference to access terminals in neighboring cells than an access network transmitting through a single antenna to its access terminals.

An access network (AN) may be a fixed station or base station used for communicating with the terminals and may also be referred to as an access point, a Node B, a base station, an enhanced base station, an eNodeB (eNB), or some other terminology. An access terminal (AT) may also be called user equipment (UE), a wireless communication device, terminal, access terminal or some other terminology.

Figure 2:
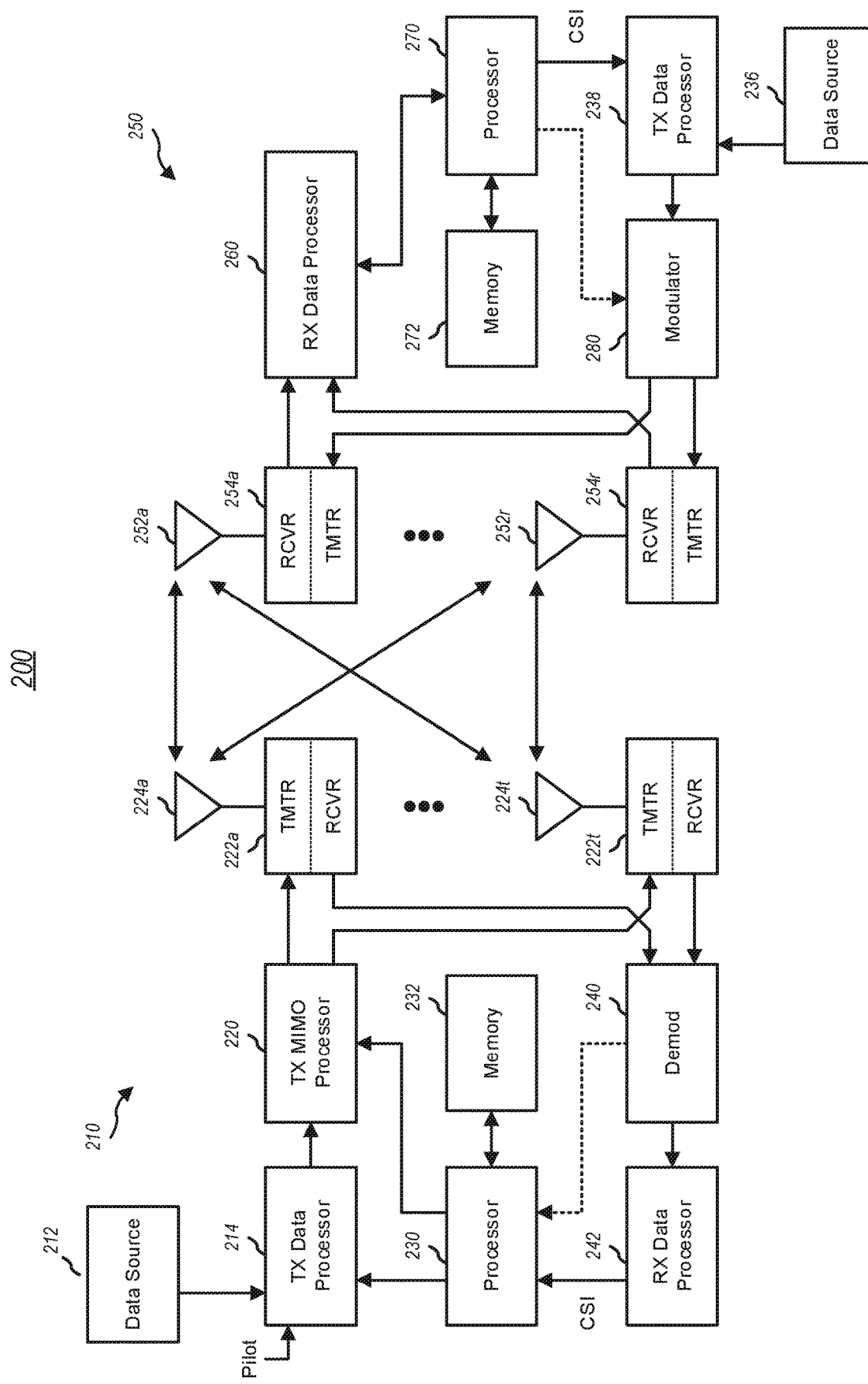
FIG. 2 is a block diagram of a transmitter system (also known as access network) and a receiver system (also known as user equipment or UE) according to one exemplary embodiment.

FIG. 2 presents an embodiment of a transmitter system 210 (also known as the access network) and a receiver system 250 (also known as access terminal (AT) or user equipment (UE)) in a multiple-input and multiple-output (MIMO) system 200. At the transmitter system 210, traffic data for a number of data streams may be provided from a data source 212 to a transmit (TX) data processor 214.

In one embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using orthogonal frequency-division multiplexing (OFDM) techniques. The pilot data may typically be a known data pattern that is processed in a known manner and may be used at the receiver system to estimate the channel response. The multiplexed pilot and coded data for each data stream may then be modulated (i.e., symbol mapped) based on a particular modulation scheme (e.g., binary phase shift keying (BPSK), quadrature phase shift keying (QPSK), M-ary phase shift keying (M-PSK), or M-ary quadrature amplitude modulation (M-QAM)) selected for that data stream to provide modulation symbols. The data rate, coding, and/or modulation for each data stream may be determined by instructions performed by processor 230.

The modulation symbols for data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 may apply beamforming weights to the symbols of the data streams and to the antenna from which the symbol is being transmitted.

Each transmitter 222 receives and processes a respective symbol stream to provide one or more analog signals, and further conditions (e.g., amplifies, filters, and/or upconverts) the analog signals to provide a modulated signal suitable for transmission over the MIMO channel. $N_T$ modulated signals from transmitters 222a through 222t may then be transmitted from $N_T$ antennas 224a through 224t, respectively.

At receiver system 250, the transmitted modulated signals are received by $N_R$ antennas 252a through 252r and the received signal from each antenna 252 may be provided to a respective receiver (RCVR) 254a through 254r. Each receiver 254 may condition (e.g., filters, amplifies, and downconverts) a respective received signal, digitize the conditioned signal to provide samples, and/or further process the samples to provide a corresponding "received" symbol stream.

An RX data processor 260 then receives and/or processes the $N_R$ received symbol streams from $N_R$ receivers 254 based on a particular receiver processing technique to provide $N_T$ "detected" symbol streams. The RX data processor 260 may then demodulate, deinterleave, and/or decode each detected symbol stream to recover the traffic data for the data stream. The processing by RX data processor 260 may be complementary to that performed by TX MIMO processor 220 and TX data processor 214 at transmitter system 210.

A processor 270 may periodically determine which precoding matrix to use (discussed below). Processor 270 formulates a reverse link message comprising a matrix index portion and a rank value portion.

The reverse link message may comprise various types of information regarding the communication link and/or the received data stream. The reverse link message may then be processed by a TX data processor 238, which may also receive traffic data for a number of data streams from a data source 236, modulated by a modulator 280, conditioned by transmitters 254a through 254r, and/or transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 may then determine which pre-coding matrix to use for determining the beamforming weights and may then process the extracted message.

Figure 3:
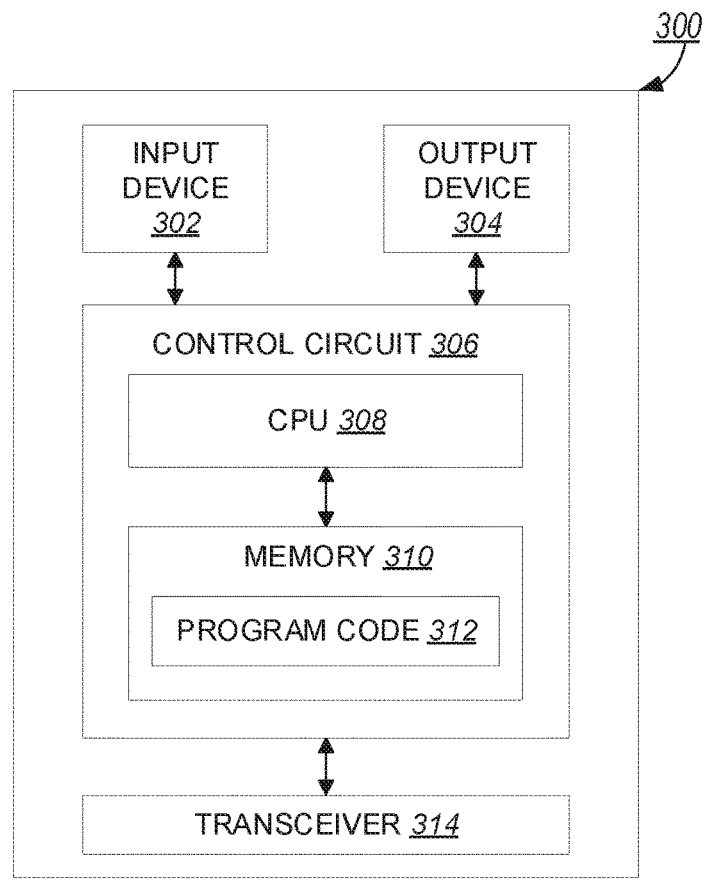
FIG. 3 is a functional block diagram of a communication system according to one exemplary embodiment.

FIG. 3 presents an alternative simplified functional block diagram of a communication device according to one embodiment of the disclosed subject matter. As shown in FIG. 3, the communication device 300 in a wireless communication system can be utilized for realizing the UEs (or ATs) 116 and 122 in FIG. 1 or the base station (or AN) 100 in FIG. 1, and the wireless communications system may be the LTE system. The communication device 300 may include an input device 302, an output device 304, a control circuit 306, a central processing unit (CPU) 308, a memory 310, a program code 312, and a transceiver 314. The control circuit 306 executes the program code 312 in the memory 310 through the CPU 308, thereby controlling an operation of the communications device 300. The communications device 300 can receive signals input by a user through the input device 302, such as a keyboard or keypad, and can output images and sounds through the output device 304, such as a monitor or speakers. The transceiver 314 is used to receive and transmit wireless signals, delivering received signals to the control circuit 306, and outputting signals generated by the control circuit 306 wirelessly. The communication device 300 in a wireless communication system can also be utilized for realizing the AN 100 in FIG. 1.

Figure 4:
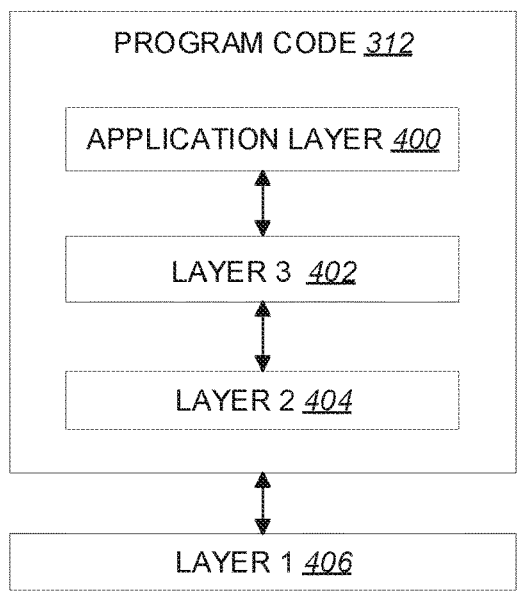
FIG. 4 is a functional block diagram of the program code of FIG. 3 according to one exemplary embodiment.

FIG. 4 is a simplified block diagram of the program code 312 shown in FIG. 3 in accordance with one embodiment of the disclosed subject matter. In this embodiment, the program code 312 includes an application layer 400, a Layer 3 portion 402, and a Layer 2 portion 404, and is coupled to a Layer 1 portion 406. The Layer 3 portion 402 may perform radio resource control. The Layer 2 portion 404 may perform link control. The Layer 1 portion 406 may perform and/or implement physical connections.

3GPP TS 36.213 V15.3.0 specifies the UE procedure for Vehicle-to-Everything (V2X) transmission. V2X transmissions are performed as sidelink transmission mode 3 or sidelink transmission mode 4.

14.1.1 UE Procedure for Transmitting the PSSCH

[ ... ]

If the UE transmits SCI format 1 on PSCCH according to a PSCCH resource configuration in subframe n, then for the corresponding PSSCH transmissions of one TB for sidelink transmission mode 3, the set of subframes and the set of resource blocks are determined using the subframe pool indicated by the PSSCH resource configuration (described in Subclause 14.1.5) and using "Retransmission index and Time gap between initial transmission and retransmission" field and "Frequency resource location of the initial transmission and retransmission" field in the SCI format 1 as described in Subclause 14.1.1.4A.

[ ... ]

14.2 Physical Sidelink Control Channel Related Procedures

For sidelink transmission mode 3, if a UE is configured by higher layers to receive DCI format 5A with the CRC scrambled by the SL-V-RNT1 or SL-SPS-V-RNT1, the UE shall decode the PDCCH/EPDCCH according to the combination defined in Table 14.2-2. A UE is not expected to receive DCI format 5A with size larger than DCI format 0 in the same search space that DCI format 0 is defined on.

TABLE 14.2-2

PDCCH/EPDCCH configured by SL-V-RNTI or SL-SPS-V-RNTI

| DCI format | Search Space |
| --- | --- |
| DCI format 5A | For PDCCH: Common and UE specific by C-RNTI<br>For EPDCCH: UE specific by C-RNTI |

The carrier indicator field value in DCI format 5A corresponds to v2x-InterFreqInfo.

[ ... ]

14.2.1 UE Procedure for Transmitting the PSCCH

For sidelink transmission mode 3,

The UE shall determine the subframes and resource blocks for transmitting SCI format 1 as follows:

SCI format 1 is transmitted in two physical resource blocks per slot in each subframe where the corresponding PSSCH is transmitted.

If the UE receives in subframe n DCI format 5A with the CRC scrambled by the SL-V-RNTI, one transmission of PSCCH is in the PSCCH resource $L_{Init}$ (described in Subclause 14.2.4) in the first subframe that is included in $(t_0^{SL}, t_1^{SL}, t_2^{SL}, \ldots)$ and that starts not earlier than $$T_{DL} - \frac{N_{TA}}{2} \times T_S + (4+m) \times 10^{-3}.$$

$L_{Init}$ is the value indicated by "Lowest index of the subchannel allocation to the initial transmission" associated with the configured sidelink grant (described in [8]), $(t_0^{SL}, t_1^{SL}, t_2^{SL}, \ldots)$ is determined by Subclause 14.1.5, the value m is indicated by 'SL index' field in the corresponding DCI format 5A according to Table 14.2.1-1 if this field is present and m=0 otherwise, $T_{DL}$ is the start of the downlink subframe carrying the DCI, and $N_{TA}$ and $T_S$ are described in [3].

If "Time gap between initial transmission and retransmission" in the configured sidelink grant (described in [8]) is not equal to zero, another transmission of PSCCH is in the PSCCH resource $L_{ReTX}$ in subframe $t_{q+SF_{gap}}^{SL}$, where $SF_{gap}$ is the value indicated by "Time gap between initial transmission and retransmission" field in the configured sidelink grant, . . . .

If the UE receives in subframe n DCI format 5A with the CRC scrambled by the SL-SPS-V-RNTI, the UE shall consider the received DCI information as a valid sidelink semi-persistent activation or release only for the SPS configuration indicated by the SL SPS configuration index field. If the received DCI activates an SL SPS configuration, one transmission of PSCCH is in the PSCCH resource $L_{Init}$ (described in Subclause 14.2.4) in the first subframe that is included in $(t_0^{SL}, t_1^{SL}, t_2^{SL}, \ldots)$ and that starts not earlier than $$T_{DL} - \frac{N_{TA}}{2} \times T_S + (4+m) \times 10^{-3}.$$

$L_{Init}$ is the value indicated by "Lowest index of the subchannel allocation to the initial transmission" associated with the configured sidelink grant (described in [8]), $(t_0^{SL}, t_1^{SL}, t_2^{SL}, \ldots)$ is determined by Subclause 14.1.5, the value m is indicated by 'SL index' field in the corresponding DCI format 5A according to Table 14.2.1-1 if this field is present and m=0 otherwise, $T_{DL}$ is the start of the downlink subframe carrying the DCI, and $N_{TA}$ and $T_S$ are described in [3].

If "Time gap between initial transmission and retransmission" in the configured sidelink grant (described in [8]) is not equal to zero, another transmission of PSCCH is in the PSCCH resource $L_{ReTX}$ in subframe $t_{q+SF_{gap}}^{SL}$, where $SF_{gap}$ is the value indicated by "Time gap between initial transmission and retransmission" field in the configured sidelink grant, . . . .

The UE shall set the contents of the SCI format 1 as follows:
  the UE shall set the Modulation and coding scheme as indicated by higher layers.
  the UE shall set the "Priority" field according to the highest priority among those priority(s) indicated by higher layers corresponding to the transport block.
  the UE shall set the Time gap between initial transmission and retransmission field, the Frequency resource location of the initial transmission and retransmission field, and the Retransmission index field such that the set of time and frequency resources determined for PSSCH according to Subclause 14.1.1.4C is in accordance with the PSSCH resource allocation indicated by the configured sidelink grant.
  the UE shall set the Resource reservation according to table 14.2.1-2 based on indicated value X, where X is equal to the Resource reservation interval provided by higher layers divided by 100.
  Each transmission of SCI format 1 is transmitted in one subframe and two physical resource blocks per slot of the subframe.
[ . . . ]

TABLE 14.2.1-1

Mapping of DCI format 5A offset field to indicated value m

| SL index field in DCI format 5A | Indicated value m |
|---|---|
| '00' | 0 |
| '01' | 1 |
| '10' | 2 |
| '11' | 3 |

TABLE 14.2.1-2

Determination of the Resource reservation field in SCI format 1

| Resource reservation field in SCI format 1 | Indicated value X | Condition |
|---|---|---|
| '0001', '0010', . . . , '1010' | Decimal equivalent of the field | The higher layer decides to keep the resource for the transmission of the next transport block and the value X meets 1 ≤ X ≤ 10. |
| '1011' | 0.5 | The higher layer decides to keep the resource for the transmission of the next transport block and the value X is 0.5. |
| '1100' | 0.2 | The higher layer decides to keep the resource for the transmission of the next transport block and the value X is 0.2. |
| '0000' | 0 | The higher layer decides not to keep the resource for the transmission of the next transport block. |
| '1101', '1110', '1111' | Reserved | |

3GPP TS 36.213 V15.3.0 specifies that the UE transmits hybrid automatic repeat request-acknowledgement (HARQ-ACK) feedback to network, depending on transport block(s) or a Physical Downlink Control Channel (PDCCH)/Enhanced PDCCH (EPDCCH) indicating downlink Semi-Persistent Scheduling (SPS) release.

7.3.1 FDD HARQ-ACK Reporting Procedure

For FDD with PUCCH format 1a/1b transmission, when both HARQ-ACK and SR are transmitted in the same sub-frame/slot, a UE shall transmit the HARQ-ACK on its assigned HARQ-ACK PUCCH format 1a/1b resource for a negative SR transmission and transmit the HARQ-ACK on its assigned SR PUCCH resource for a positive SR transmission.

For FDD with PUCCH format 1a transmission, when both HARQ-ACK and SR are transmitted in the same subslot, a UE shall transmit the HARQ-ACK bit according to Table 7.3.1-0A;

TABLE 7.3.1-0A

PUCCH format 1a resource for transmission of HARQ-ACK bit and SR

| HARQ-ACK | SR transmission | Resource for HARQ-ACK bits transmission |
|---|---|---|
| ACK/NACK | negative | HARQ-ACK PUCCH format 1a resource |
| NACK | positive | The first SR PUCCH resource value configured by the higher layers |
| ACK | positive | The second SR PUCCH resource value configured by the higher layers | for FDD with PUCCH format 1b transmission, when both HARQ-ACK and SR are transmitted in the same subslot, a UE shall transmit the HARQ-ACK bits according to Table 7.3.1-0B;

TABLE 7.3.1-0B

PUCCH format 1b resource for transmission of HARQ-ACK bits

| HARQ-ACK(0) | HARQ-ACK(1) | SR transmission | Resource for HARQ-ACK bits transmission |
|---|---|---|---|
| ACK/NACK | ACK/NACK | negative | HARQ-ACK PUCCH format 1b resource |
| NACK | NACK | positive | The first SR PUCCH resource value configured by the higher layers |
| NACK | ACK | positive | The second SR PUCCH resource value configured by the higher layers |
| ACK | NACK | positive | The third SR PUCCH resource value configured by the higher layers |
| ACK | ACK | positive | The fourth SR PUCCH resource value configured by the higher layers | where SR PUCCH resources are configured by higher layer parameter sr-SubslotSPUCCH-Resource, and HARQ-ACK (j), j=0, 1 denotes the ACK/NACK response for a transport block or SPS release PDCCH/EPDCCH/SPDCCH associated with serving cell c.

For FDD with PUCCH format 1b with channel selection, when both HARQ-ACK and SR are transmitted in the same sub-frame a UE shall transmit the HARQ-ACK on its assigned HARQ-ACK PUCCH resource with channel selection as defined in Subclause 10.1.2.2.1 for a negative SR transmission and transmit one HARQ-ACK bit per serving cell on its assigned SR PUCCH resource for a positive SR transmission according to the following:
  if only one transport block or a PDCCH/EPDCCH indicating downlink SPS release is detected on a serving cell, the HARQ-ACK bit for the serving cell is the HARQ-ACK bit corresponding to the transport block or the PDCCH/EPDCCH indicating downlink SPS release;
  if neither PDSCH transmission for which HARQ-ACK response shall be provided nor PDCCH/EPDCCH indicating downlink SPS release is detected for a serving cell, the HARQ-ACK bit for the serving cell is set to NACK;

and the HARQ-ACK bits for the primary cell and the secondary cell are mapped to b(0) and b(1), respectively, where b(0) and b(1) are specified in Subclause 5.4.1 in [3]. For FDD, when a PUCCH format 3/4/5 transmission of HARQ-ACK coincides with a subframe/slot/subslot configured to the UE by higher layers for transmission of a scheduling request, the UE shall multiplex HARQ-ACK and SR bits on HARQ-ACK PUCCH resource as defined in Subclause 5.2.3.1 in [4], unless the HARQ-ACK corresponds to a subframe-PDSCH transmission on the primary cell only or a PDCCH/EPDCCH indicating downlink SPS release on the primary cell only, in which case the SR shall be transmitted as for FDD with PUCCH format 1a/1b.

For a non-BL/CE UE for FDD and for a PUSCH transmission, a UE shall not transmit HARQ-ACK on PUSCH in subframe/slot/subslot n if the UE does not receive PDSCH or PDCCH/SPDCCH indicating downlink SPS release in
    subframe n–$k_p$ for subframe-PDSCH or in subframe n–4 for PDCCH indicating downlink SPS release
    slot n–4 for slot-PDSCH 3GPP TS 36.212 V15.2.1 specifies downlink control information. The downlink shared channel and downlink control information are for communication between network node and User Equipment (UE), i.e. Uu link.

5.3.3.1.9A Format 5A

DCI format 5A is used for the scheduling of PSCCH, and also contains several SCI format 1 fields used for the scheduling of PSSCH.

The following information is transmitted by means of the DCI format 5A:
  Carrier indicator—3 bits. This field is present according to the definitions in [3].
  Lowest index of the subchannel allocation to the initial transmission—$\lceil \log_2 (N_{subchannel}^{SL}) \rceil$ bits as defined in subclause 14.1.1.4C of [3].
  SCI format 1 fields according to 5.4.3.1.2:
    Frequency resource location of initial transmission and retransmission.
    Time gap between initial transmission and retransmission.
  SL index—2 bits as defined in subclause 14.2.1 of [3] (this field is present only for cases with TDD operation with uplink-downlink configuration 0-6).

3GPP TS 36.212 V15.2.1 also specifies sidelink control information. The sidelink shared channel and sidelink control information are for communication between devices, i.e. PC5 link or device-to-device link.
[ . . . ]

5.4.3.1.2 SCI Format 1

SCI format 1 is used for the scheduling of PSSCH.
The following information is transmitted by means of the SCI format 1:
  Priority—3 bits as defined in subclause 4.4.5.1 of [7].
  Resource reservation—4 bits as defined in subclause 14.2.1 of [3].
  Frequency resource location of initial transmission and retransmission—$\lceil \log_2 (N_{subchannel}^{SL} (N_{subchannel}^{SL}+1)/2) \rceil$ bits as defined in subclause 14.1.1.4C of [3].
  Time gap between initial transmission and retransmission—4 bits as defined in subclause 14.1.1.4C of [3].
  Modulation and coding scheme—5 bits as defined in subclause 14.2.1 of [3].
  Retransmission index—1 bit as defined in subclause 14.2.1 of [3].
  Transmission format—1 bit, where value 1 indicates a transmission format including rate-matching and TBS scaling, and value 0 indicates a transmission format including puncturing and no TBS-scaling. This field is only present if the transport mechanism selected by higher layers indicates the support of rate matching and TBS scaling.
  Reserved information bits are added until the size of SCI format 1 is equal to 32 bits. The reserved bits are set to zero.

3GPP TS 36.211 V15.2.0 also specifies generation for physical sidelink shared channel and physical sidelink control channel. The physical sidelink shared channel and physical sidelink control channel are for communication between devices, i.e. PC5 link or device-to-device link. The physical sidelink shared channel (PSSCH) delivers data/transport block for sidelink shared channel (SL-SCH). The physical sidelink control channel (PSCCH) delivers sidelink control information (SCI).

RP-182111 specifies the Justification and objective of study item on New Radio Access Technology (NR) V2X. The detailed description of each use case group is provided as below.

Vehicles Platooning enables the vehicles to dynamically form a platoon travelling together. All the vehicles in the platoon obtain information from the leading vehicle to manage this platoon. These information allow the vehicles to drive closer than normal in a coordinated manner, going to the same direction and travelling together.

Extended Sensors enables the exchange of raw or processed data gathered through local sensors or live video images among vehicles, road site units, devices of pedestrian and V2X application servers. The vehicles can increase the perception of their environment beyond of what their own sensors can detect and have a more broad and holistic view of the local situation. High data rate is one of the key characteristics.

Advanced Driving enables semi-automated or full-automated driving. Each vehicle and/or RSU shares its own perception data obtained from its local sensors with vehicles in proximity and that allows vehicles to synchronize and coordinate their trajectories or manoeuvres. Each vehicle shares its driving intention with vehicles in proximity too.

Remote Driving enables a remote driver or a V2X application to operate a remote vehicle for those passengers who cannot drive by themselves or remote vehicles located in dangerous environments. For a case where variation is limited and routes are predictable, such as public transportation, driving based on cloud computing can be used. High reliability and low latency are the main requirements.

In R1-1810051, RAN1 has some agreements about NR V2X.
Agreements:
  At least two sidelink resource allocation modes are defined for NR-V2X sidelink communication
    Mode 1: Base station schedules sidelink resource(s) to be used by UE for sidelink transmission(s)
    Mode 2: UE determines (i.e. base station does not schedule) sidelink transmission resource(s) within sidelink resources configured by base station/network or pre-configured sidelink resources
  In R1-1812101, RAN1 has some agreements about NR V2X.

Agreements:
  Sidelink control information (SCI) is defined.
    SCI is transmitted in PSCCH.
  Sidelink feedback control information (SFCI) is defined.
    SFCI includes at least one SFCI format which includes HARQ-ACK for the corresponding PSSCH.
Agreements:
  At least resource pool is supported for NR sidelink
  In Draft Report of 3GPP TSG RAN WG1 #95 v0.1.0, RAN1 has some agreements about NR V2X.
Agreements:
  Physical sidelink feedback channel (PSFCH) is defined and it is supported to convey SFCI for unicast and groupcast via PSFCH.
Agreements:
  When SL HARQ feedback is enabled for unicast, the following operation is supported for the non-CBG case:
    Receiver UE generates HARQ-ACK if it successfully decodes the corresponding TB. It generates HARQ-NACK if it does not successfully decode the corresponding TB after decoding the associated PSCCH which targets the receiver UE.
Agreements:
  When SL HARQ feedback is enabled for groupcast, the following operations are further studied for the non-CBG case:
    Option 1: Receiver UE transmits HARQ-NACK on PSFCH if it fails to decode the corresponding TB after decoding the associated PSCCH. It transmits no signal on PSFCH otherwise.
    Option 2: Receiver UE transmits HARQ-ACK on PSFCH if it successfully decodes the corresponding TB. It transmits HARQ-NACK on PSFCH if it does not successfully decode the corresponding TB after decoding the associated PSCCH which targets the receiver UE.
Agreements:
  It is supported to enable and disable SL HARQ feedback in unicast and groupcast.
  In Draft Report of 3GPP TSG RAN WG1 #AH_1901 v0.1.0, RAN1 has some agreements about NR V2X.
Agreements:
  For determining the resource of PSFCH containing HARQ feedback, support that the time gap between PSSCH and the associated PSFCH is not signaled via PSCCH at least for modes 2(a)(c)(d) (if respectively supported)
Agreements:
  It is supported that in mode 1 for unicast, the in-coverage UE sends an indication to gNB to indicate the need for retransmission
    At least PUCCH is used to report the information
      If feasible, RAN1 reuses PUCCH defined in Rel-15
    The gNB can also schedule re-transmission resource
Agreements:
  (Pre-)configuration indicates whether SL HARQ feedback is enabled or disabled in unicast and/or groupcast. When (pre-)configuration enables SL HARQ feedback,
Agreements:
  Sub-channel based resource allocation is supported for PSSCH
Agreement:
  SCI decoding applied during sensing procedure provides at least information on sidelink resources indicated by the UE transmitting the SCI In 3GPP TS 38.213 V15.4.0, HARQ-ACK codebook is quoted below.
9 UE procedure for reporting control information
[ . . . ]
A HARQ-ACK information bit value of 0 represents a negative acknowledgement (NACK) while a HARQ-ACK information bit value of 1 represents a positive acknowledgement (ACK).
[ . . . ]
9.1 HARQ-ACK Codebook Determination
If a UE receives a PDSCH without receiving a corresponding PDCCH, or if the UE receives a PDCCH indicating a SPS PDSCH release, the UE generates one corresponding HARQ-ACK information bit.
9.1.2 Type-1 HARQ-ACK Codebook Determination
This subclause applies if the UE is configured with pdsch-HARQ-ACK-Codebook=semi-static.
A UE reports HARQ-ACK information for a corresponding PDSCH reception or SPS PDSCH release only in a HARQ-ACK codebook that the UE transmits in a slot indicated by a value of a PDSCH-to-HARQ_feedback timing indicator field in a corresponding DCI format 1_0 or DCI format 1_1. The UE reports NACK value(s) for HARQ-ACK information bit(s) in a HARQ-ACK codebook that the UE transmits in a slot not indicated by a value of a PDSCH-to-HARQ_feedback timing indicator field in a corresponding DCI format 1_0 or DCI format 1_1.
If a UE reports HARQ-ACK information in a PUCCH only for
  a SPS PDSCH release indicated by DCI format 1_0 with counter DAI field value of 1 on the PCell, or
  a PDSCH reception scheduled by DCI format 1_0 with counter DAI field value of 1 on the PCell, or
  SPS PDSCH reception
within the $M_{A,c}$ occasions for candidate PDSCH receptions as determined in Subclause 9.1.2.1, the UE determines a HARQ-ACK codebook only for the SPS PDSCH release or only for the PDSCH reception or only for the SPS PDSCH reception according to corresponding $M_{A,c}$ occasion(s) on respective serving cell(s); otherwise, the procedures in Subclause 9.1.2.1 and Subclause 9.1.2.2 for a HARQ-ACK codebook determination apply.
9.1.2.1 Type-1 HARQ-ACK Codebook in Physical Uplink Control Channel
For a serving cell c, an active DL BWP, and an active UL BWP, as described in Subclause 12, the UE determines a set of $M_{A,c}$ occasions for candidate PDSCH receptions for which the UE can transmit corresponding HARQ-ACK information in a PUCCH in slot $n_U$. If serving cell c is deactivated, the UE uses as the active DL BWP for determining the set of $M_{A,c}$ occasions for candidate PDSCH receptions a DL BWP provided by firstActiveDownlinkBWP. The determination is based:
  a) on a set of slot timing values $K_1$ associated with the active UL BWP
    a) If the UE is configured to monitor PDCCH for DCI format 1_0 and is not configured to monitor PDCCH for DCI format 1_1 on serving cell c, $K_1$ is provided by the slot timing values {1, 2, 3, 4, 5, 6, 7, 8} for DCI format 1_0
    b) If the UE is configured to monitor PDCCH for DCI format 1_1 for serving cell c, $K_1$ is provided by dl-DataToUL-ACK for DCI format 1_1
  b) on a set of row indexes R of a table that is provided either by a first set of row indexes of a table that is provided by PDSCH-TimeDomainResourceAllocationList in PDSCH-ConfigCommon or by Default PDSCH time domain resource allocation A [6, TS 38.214], or by the union of the first set of row indexes and a second set of row indexes, if provided by PDSCH-TimeDomainResourceAllocationList in PDSCH-Config, associated with the active DL BWP and defining respective sets of slot offsets $K_0$, start and length indicators SLIV, and PDSCH mapping types for PDSCH reception as described in [6, TS 38.214]

c) on the ratio $2^{\mu_{DL}-\mu_{UL}}$ between the downlink SCS configuration $\mu_{DL}$ and the uplink SCS configuration $\mu_{DL}$ provided by subcarrierSpacing in BWP-Downlink and BWP-Uplink for the active DL BWP and the active UL BWP, respectively d) if provided, on TDD-UL-DL-ConfigurationCommon and TDD-UL-DL-ConfigDedicated as described in Subclause 11.1.

For the set of slot timing values $K_1$, the UE determines a set of $M_{A,c}$ occasions for candidate PDSCH receptions or SPS PDSCH releases according to the following pseudo-code. A location in the Type-1 HARQ-ACK codebook for HARQ-ACK information corresponding to a SPS PDSCH release is same as for a corresponding SPS PDSCH reception.

```
Set j = 0 - index of occasion for candidate PDSCH reception or SPS PDSCH release
Set B = Ø
Set M_{A,c} = Ø
Set 𝒞 (K_1) to the cardinality of set K_1
Set k = 0 - index of slot timing values K_{1,k} , in descending order of the slot timing values, in set K_1
for serving cell c
while k < 𝒞 (K_1 )
    if mod (n_U - K_{1,k} + 1, max (2^{μUL-μDL} ,1)) = 0
        Set n_D = 0 - index of a DL slot within an UL slot
        while n_D < max(2^{μDL-μUL} ,1)
            Set R to the set of rows
            Set 𝒞 (R) to the cardinality of R
            Set r = 0 - index of row in set R
            if slot n_U starts at a same time as or after a slot for an active DL BWP change on serving
                cell c or an active UL BWP change on the PCell and slot ⌊(n_U - K_{1,k} )· 2^{μDL-μUL}⌋+ n_D is
                before the slot for the active DL BWP change on serving cell c or the active UL BWP
                change on the PCell
                continue;
            else
                while r < 𝒞 (R)
                    if the UE is provided TDD-UL-DL-ConfigurationCommon, or TDD-UL-DL-
                        ConfigDedicated and, for each slot from slot ⌊(n_U - K_{1,k} )· 2^{μDL-μUL}⌋+ n_D - N_{PDSCH}^{repeat} + 1
                        to slot ⌊(n_U - K_{1,k} )· 2^{μDL-μUL}⌋+ n_D , at least one symbol of the PDSCH time resource
                        derived by row r is configured as UL where K_{1,k} is the k-th slot timing value in
                        set K_1 ,
                        R = R\r;
                    end if
                    r = r + 1;
                end while
                if the UE does not indicate a capability to receive more than one unicast PDSCH per
                    slot and R ≠ Ø ,
                    M_{A,c} = M_{A,c} ∪ j ;
                    j = j + 1;
                    The UE does not expect to receive SPS PDSCH release and unicast PDSCH in a
                        same slot;
                else
                    Set 𝒞 (R) to the cardinality of R
                    Set m to the smallest last OFDM symbol index, as determined by the SLIV,
                        among all rows of R
                    while R ≠ Ø
                        Set r = 0
                        while r < 𝒞 (R)
                            if S ≤ m for start OFDM symbol index S for row r
                                b_{r,k,n_D} = j ; - index of occasion for candidate PDSCH reception or SPS
                                    PDSCH release associated with row r
                                R = R\r;
                                B = B∪b_{r,k,n_D} ;
                            end if
                            r = r + 1;
                        end while
                        M_{A,c} = M_{A,c} ∪ j;
                        j = j + 1;
                        Set m to the smallest last OFDM symbol index among all rows of R ;
                    end while
                end if
            end if
            n_D = n_D + 1;
        end while
    end if
    k = k + 1;
end while
If a UE receives a SPS PDSCH, or a SPS PDSCH release, or a PDSCH that is scheduled by a
DCI format 1_0 and if
    - the UE is configured with one serving cell, and
    - 𝒞 (M_{A,c})=1, and
    - PDSCH-CodeBlockGroupTransmission is provided to the UE
``` the UE generates HARQ-ACK information only for the transport block in the PDSCH or only for the SPS PDSCH release.

---

If a UE is provided dl-DataToUL-ACK, the UE does not expect to be indicated by DCI format 1_0 a slot timing value for transmission of HARQ-ACK information that does not belong to the intersection of the set of slot timing values {1, 2, 3, 4, 5, 6, 7, 8} and the set of slot timing values provided by dl-DataToUL-ACK for the active DL BWP of a corresponding serving cell.

A UE determines $\tilde{O}_0^{ACK}, \tilde{O}_1^{ACK}, \ldots, \tilde{O}_{O^{ACK}-1}^{ACK}$ HARQ-ACK information bits, for a total number of $o_{ACK}$ HARQ-ACK information bits, of a HARQ-ACK codebook for transmission in a PUCCH according to the following pseudo-code . . . . The cardinality of the set $M_{A,c}$ defines a total number $M_c$ of occasions for PDSCH reception or SPS PDSCH release for serving cell c corresponding to the HARQ-ACK information bits.

```
Set c = 0 - serving cell index: lower indexes correspond to lower RRC indexes of corresponding
cell
Set j = 0 - HARQ-ACK information bit index
Set N_cells^DL to the number of serving cells configured by higher layers for the UE
    while c < N_cells^DL
        Set m = 0 - index of occasion for candidate PDSCH reception or SPS PDSCH release
        while m < M_c
            if harq-ACK-SpatialBundlingPUCCH is not provided, PDSCH-
                CodeBlockGroupTransmission is not provided, and the UE is configured by
                maxNrofCodeWordsScheduledByDCI with reception of two transport blocks for the
                active DL BWP of serving cell c,
                õ_j^ACK = HARQ-ACK information bit corresponding to a first transport block of this
                    cell;
                j = j + 1;
                õ_j^ACK = HARQ-ACK information bit corresponding to a second transport block of this
                    cell;
                j = j + 1;
            elseif harq-ACK-SpatialBundlingPUCCH is provided, and the UE is configured by
                maxNrofCodeWordsScheduledByDCI with reception of two transport blocks for the
                active DL BWP of serving cell c,
                õ_j^ACK = binary AND operation of the HARQ-ACK information bits corresponding to
                    first and second transport blocks of this cell - if the UE receives one transport
                    block, the UE assumes ACK for the second transport block;
                j = j + 1;
            elseif PDSCH-CodeBlockGroupTransmission is provided, and N_HARQ-ACK,c^CBG/TB,max CBGs are
                indicated by maxCodeBlockGroupsPerTransportBlock for serving cell c ,
                Set n_CBG = 0 - CBG index
                while n_CBG < N_HARQ-ACK, c^CBG/TB, max
                    o_{j+n_CBG}^ACK = HARQ-ACK information bit corresponding to CBG n_CBG of the first
                        transport block;
                    if the UE is configured by maxNrofCodeWordsScheduledByDCI with reception of
                        two transport blocks for the active DL BWP of serving cell c
                        õ_{j+n_CBG+N_HARQ-ACK,c}^{CBG/TB,maxACK} = HARQ-ACK information bit corresponding to CBG n_CBG of
                            the second transport block;
                    end if
                    n_CBG = n_CBG + 1 ;
                end while
                j = j + N_TB,c^DL · N_HARQ-ACK,c^CBG/TBmax , where N_TB,c^DL is the value of
                    maxNrofCodeWordsScheduledByDCI for the active DL BWP of serving cell c ;
            else
                õ_j^ACK = HARQ-ACK information bit of serving cell c ;
                j = j + 1 ;
            end if
            m = m + 1 ;
        end while
        c = c + 1;
    end while
```

9.1.3 Type-2 HARQ-ACK codebook determination

This subclause applies if the UE is configured with pdsch-HARQ-ACK-Codebook=dynamic.

9.1.3.1 Type-2 HARQ-ACK codebook in physical uplink control channel

A UE determines monitoring occasions for PDCCH with DCI format 1_0 or DCI format 1_1 for scheduling PDSCH receptions or SPS PDSCH release on an active DL BWP of a serving cell c, as described in Subclause 10.1, and for which the UE transmits HARQ-ACK information in a same PUCCH in slot n based on

- PDSCH-to-HARQ_feedback timing values for PUCCH transmission with HARQ-ACK information in slot n in response to PDSCH receptions or SPS PDSCH release slot offsets $K_0$ [6, TS 38.214] provided by time domain resource assignment field in DCI format 1_0 or DCI format 1_1 for scheduling PDSCH receptions or SPS PDSCH release and by pdsch-AggregationFactor, when provided.

The set of PDCCH monitoring occasions for DCI format 1_0 or DCI format 1_1 for scheduling PDSCH receptions or SPS PDSCH release is defined as the union of PDCCH monitoring occasions across active DL BWPs of configured serving cells, ordered in ascending order of start time of the search space set associated with a PDCCH monitoring occasion. The cardinality of the set of PDCCH monitoring occasions defines a total number M of PDCCH monitoring occasions.

A value of the counter downlink assignment indicator (DAI) field in DCI format 1_0 or DCI format 1_1 denotes the accumulative number of {serving cell, PDCCH monitoring occasion}—pair(s) in which PDSCH reception(s) or SPS PDSCH release associated with DCI format 1_0 or DCI format 1_1 is present, up to the current serving cell and current PDCCH monitoring occasion, first in ascending order of serving cell index and then in ascending order of PDCCH monitoring occasion index m, where $0 \leq m < M$.

The value of the total DAI, when present [5, TS 38.212], in DCI format 1_1 denotes the total number of {serving cell, PDCCH monitoring occasion}-pair(s) in which PDSCH reception(s) or SPS PDSCH release associated with DCI format 1_0 or DCI format 1_1 is present, up to the current PDCCH monitoring occasion m and is updated from PDCCH monitoring occasion to PDCCH monitoring occasion.

Denote by $V_{C\text{-}DAI,c,m}^{DL}$ the value of the counter DAI in DCI format 1_0 or DCI format 1_1 for scheduling on serving cell c in PDCCH monitoring occasion m according to Table 9.1.3-1. Denote by $V_{T\text{-}DAI,m}^{DL}$ the value of the total DAI in DCI format 1_1 in PDCCH monitoring occasion m according to Table 9.1.3-1. The UE assumes a same value of total DAI in all DCI formats 1_1 in PDCCH monitoring occasion m.

If the UE transmits HARQ-ACK information in a PUCCH in slot n and for any PUCCH format, the UE determines the $\tilde{O}_0^{ACK}, \tilde{O}_1^{ACK}, \ldots, \tilde{O}_{O^{ACK}-1}^{ACK}$, for a total number of $O_{ACK}$ HARQ-ACK information bits, according to the following pseudo-code:

```
Set c = 0 - serving cell index: lower indexes correspond to lower RRC indexes of
    corresponding cell
Set m = 0 - PDCCH with DCI format 1_0 or DCI format 1_1 monitoring occasion index:
    lower index corresponds to earlier PDCCH with DCI format 1_0 or DCI format 1_1
    monitoring occasion
Set j = 0
Set V_temp = 0
Set V_temp 2 = 0
Set V_s = Ø
Set N_cells^DL to the number of serving cells configured by higher layers for the UE
Set M to the number of PDCCH monitoring occasion(s)
while m < M
    while c < N_cells^DL
        if PDCCH monitoring occasion m is before an active DL BWP change on serving cell c or
        an active UL BWP change on the PCell and an active DL BWP change is not triggered by
        a DCI format 1_1 in PDCCH monitoring occasion m
            c = c + 1;
        else
            if there is a PDSCH on serving cell c associated with PDCCH in PDCCH monitoring
            occasion m, or there is a PDCCH indicating SPS PDSCH release on serving cell c
                if V_{C-DAI,c,m}^{DL} ≤ V_temp
                    j = j + 1
                end if
                V_temp = V_{C-DAI,c,m}^{DL}
                if V_{T-DAI,m}^{DL} = Ø
                    V_temp2 = V_{C-DAI,c,m}^{DL}
                else
                    V_temp 2 = V_{T-DAI,m}^{DL}
                end if
                õ_{4 j+V_{C-DAI,c,m}^{DL}-1}^{ACK} = HARQ-ACK information bit of this cell
                V_s = V_s U {4 j + V_{C-DAI,c,m}^{DL} -1}
            end if
            c = c + 1
        end if
    end while
    m = m + 1
end while
if V_temp 2 < V_temp
    j = j + 1
end if
O^{ACK} = 4 · j + V_temp 2
õ_i^{ACK} = NACK for any i ∈ {0,1,...,O^{ACK} -1}\V_s
Set c = 0
    while c < N_cells^DL
```

-continued if SPS PDSCH reception is activated for a UE and the UE is configured to receive SPS
PDSCH in a slot n−$K_{1,c}$ for serving cell c , where $K_{1,c}$ is the PDSCH-to-HARQ-
feedback timing value for SPS PDSCH on serving cell c
    $O^{ACK} = O^{ACK} + 1$
    $O_{O^{ACK}-1}^{ACK}$ = HARQ-ACK information bit associated with the SPS PDSCH reception
end if
  c = c + 1;
end while
[...]

TABLE 9.1.3-1

Value of counter DAI in DCI format 1_0 and of counter
DAI or total DAI DCI format 1_1

| DAI MSB, LSB | $V_{C-DAI}^{DL}$ or $V_{T-DAI}^{DL}$ | Number of {serving cell, PDCCH monitoring occasion}-pair(s) in which PDSCH transmission(s) associated with PDCCH or PDCCH indicating SPS PDSCH release is present, denoted as Y and Y ≥ 1 |
|---|---|---|
| 0, 0 | 1 | (Y − 1)mod 4 + 1 = 1 |
| 0, 1 | 2 | (Y − 1)mod 4 + 1 = 2 |
| 1, 0 | 3 | (Y − 1)mod 4 + 1 = 3 |
| 1, 1 | 4 | (Y − 1)mod 4 + 1 = 4 |

9.2 UCI Reporting in Physical Uplink Control Channel

UCI types reported in a PUCCH include HARQ-ACK information, SR, and CSI. UCI bits include HARQ-ACK information bits, if any, SR information bits, if any, and CSI bits, if any. The HARQ-ACK information bits correspond to a HARQ-ACK codebook as described in Subclause 9.1.

A UE may transmit one or two PUCCHs on a serving cell in different symbols within a slot of $N_{symb}^{slot}$ symbols as defined in [4, TS 38.211]. When the UE transmits two PUCCHs in a slot, at least one of the two PUCCHs uses PUCCH format 0 or PUCCH format 2.

9.2.1 PUCCH Resource Sets

If the UE provides HARQ-ACK information in a PUCCH transmission in response to detecting a DCI format 1_0 or DCI format 1_1, the UE determines a PUCCH resource with index $r_{PUCCH}$, $0 \leq r_{PUCCH} \leq 15$, as $$r_{PUCCH} = \left\lfloor \frac{2 \cdot n_{CCE,0}}{N_{CCE}} \right\rfloor + 2 \cdot \Delta_{PRI},$$

where $N_{CCE}$ is a number of CCEs in a CORESET of a PDCCH reception with DCI format 1_0 or DCI format 1_1, as described in Subclause 10.1, $n_{CCE,0}$ is the index of a first CCE for the PDCCH reception, and $\Delta_{PRI}$ is a value of the PUCCH resource indicator field in the DCI format 1_0 or DCI format 1_1.

If $\lfloor r_{PUCCH}/8 \rfloor = 0$ the UE determines the PRB index of the PUCCH transmission in the first hop as $RB_{BWP}^{offset} + \lfloor r_{PUCCH}/N_{CS} \rfloor$ and the PRB index of the PUCCH transmission in the second hop as $N_{BWP}^{offset} - 1 - RB_{BWP}^{offset} - \lfloor r_{PUCCH}/N_{CS} \rfloor$ where $N_{CS}$ is the total number of initial cyclic shift indexes in the set of initial cyclic shift indexes the UE determines the initial cyclic shift index in the set of initial cyclic shift indexes as $r_{PUCCH}$ mod $N_{CS}$ If $\lfloor r_{PUCCH}/8 \rfloor = 1$ the UE determines the PRB index of the PUCCH transmission in the first hop as $N_{BWP}^{size} - 1 - RB_{BWP}^{offset} - \lfloor (r_{PUCCH}-8)/N_{CS} \rfloor$ and the PRB index of the PUCCH transmission in the second hop as $RB_{BWP}^{offset} + \lfloor (r_{PUCCH}-8)/N_{CS} \rfloor$ the UE determines the initial cyclic shift index in the set of initial cyclic shift indexes as $(r_{PUCCH}-8)$ mod $N_{CS}$ If a UE has dedicated PUCCH resource configuration, the UE is provided by higher layers with one or more PUCCH resources.

A PUCCH resource includes the following parameters:

- a PUCCH resource index provided by pucch-ResourceId
- an index of the first PRB prior to frequency hopping or for no frequency hopping by startingPRB
- an index of the first PRB after frequency hopping by secondHopPRB;
- an indication for intra-slot frequency hopping by intraSlotFrequencyHopping
- a configuration for a PUCCH format, from PUCCH format 0 through PUCCH format 4, provided by format

[ ... ]

A UE can be configured up to four sets of PUCCH resources. A PUCCH resource set is provided by PUCCH-ResourceSet and is associated with a PUCCH resource set index provided by pucch-ResourceSetID, with a set of PUCCH resource indexes provided by resourceList that provides a set of pucch-ResourceId used in the PUCCH resource set, and with a maximum number of UCI information bits the UE can transmit using a PUCCH resource in the PUCCH resource set provided by maxPayloadMinus1. For the first PUCCH resource set, the maximum number of UCI information bits is 2. A maximum number of PUCCH resource indexes for a set of PUCCH resources is provided by maxNrofPUCCH-ResourcesPerSet. The maximum number of PUCCH resources in the first PUCCH resource set is 32 and the maximum number of PUCCH resources in the other PUCCH resource sets is 8.

If the UE transmits $O_{UCI}$ UCI information bits, that include HARQ-ACK information bits, the UE determines a PUCCH resource set to be

- a first set of PUCCH resources with pucch-ResourceSetId=0 if $O_{UCI} \leq 2$ including 1 or 2 HARQ-ACK information bits and a positive or negative SR on one SR transmission occasion if transmission of HARQ-ACK information and SR occurs simultaneously, or
- a second set of PUCCH resources with pucch-ResourceSetId=1, if provided by higher layers, if $2 < O_{UCI} \leq N_2$ where $N_2$ is provided by maxPayloadMinus1 for the PUCCH resource set with pucch-ResourceSetId=1, or
- a third set of PUCCH resources with pucch-ResourceSetId=2, if provided by higher layers, if $N_2 < O_{UCI} \leq N_3$ where $N_3$ is provided by maxPayloadMinus1 for the PUCCH resource set with pucch-ResourceSetId=2, or
- a fourth set of PUCCH resources with pucch-ResourceSetId=3, if provided by higher layers, if $N_3 < O_{UCI} \leq 1706$.

9.2.2 PUCCH Formats for UCI Transmission

If a UE is not transmitting PUSCH, and the UE is transmitting UCI, the UE transmits UCI in a PUCCH using PUCCH format 0 if
  the transmission is over 1 symbol or 2 symbols,
  the number of HARQ-ACK information bits with positive or negative SR (HARQ-ACK/SR bits) is 1 or 2

PUCCH format 1 if
  the transmission is over 4 or more symbols,
  the number of HARQ-ACK/SR bits is 1 or 2

PUCCH format 2 if
  the transmission is over 1 symbol or 2 symbols,
  the number of UCI bits is more than 2

PUCCH format 3 if
  the transmission is over 4 or more symbols,
  the number of UCI bits is more than 2,
  the PUCCH resource does not include an orthogonal cover code PUCCH format 4 if
  the transmission is over 4 or more symbols,
  the number of UCI bits is more than 2,
  the PUCCH resource includes an orthogonal cover code

9.2.3 UE Procedure for Reporting HARQ-ACK

A UE does not expect to transmit more than one PUCCH with HARQ-ACK information in a slot.

For DCI format 1_0, the PDSCH-to-HARQ-timing-indicator field values map to {1, 2, 3, 4, 5, 6, 7, 8}. For DCI format 1_1, if present, the PDSCH-to-HARQ-timing-indicator field values map to values for a set of number of slots provided by dl-DataToUL-ACK as defined in Table 9.2.3-1.

For a SPS PDSCH reception ending in slot n, the UE transmits the PUCCH in slot n+k where k is provided by the PDSCH-to-HARQ-timing-indicator field in DCI format 1_0 or, if present, in DCI format 1_1 activating the SPS PDSCH reception.

If the UE detects a DCI format 1_1 that does not include a PDSCH-to-HARQ-timing-indicator field and schedules a PDSCH reception or activates a SPS PDSCH reception ending in slot n, the UE provides corresponding HARQ-ACK information in a PUCCH transmission within slot n+k where k is provided by dl-DataToUL-ACK.

With reference to slots for PUCCH transmissions, if the UE detects a DCI format 1_0 or a DCI format 1_1 scheduling a PDSCH reception ending in slot n or if the UE detects a DCI format 1_0 indicating a SPS PDSCH release through a PDCCH reception ending in slot n, the UE provides corresponding HARQ-ACK information in a PUCCH transmission within slot n+k, where k is a number of slots and is indicated by the PDSCH-to-HARQ-timing-indicator field in the DCI format, if present, or provided by dl-DataToUL-ACK. k=0 corresponds to the last slot of the PUCCH transmission that overlaps with the PDSCH reception or with the PDCCH reception in case of SPS PDSCH release.

A PUCCH transmission with HARQ-ACK information is subject to the limitations for UE transmissions described in Subclause 11.1 and Subclause 11.1.1.

TABLE 9.2.3-1

Mapping of PDSCH-to-HARQ_feedback timing indicator field values to numbers of slots

| PDSCH-to-HARQ_feedback timing indicator | | | |
|---|---|---|---|
| 1 bit | 2 bits | 3 bits | Number of slots k |
| '0' | '00' | '000' | $1^{st}$ value provided by dl-DataToUL-ACK |
| '1' | '01' | '001' | $2^{nd}$ value provided by dl-DataToUL-ACK |
|  | '10' | '010' | $3^{rd}$ value provided by dl-DataToUL-ACK |
|  | '11' | '011' | $4^{th}$ value provided by dl-DataToUL-ACK |
|  |  | '100' | $5^{th}$ value provided by dl-DataToUL-ACK |
|  |  | '101' | $6^{th}$ value provided by dl-DataToUL-ACK |
|  |  | '110' | $7^{th}$ value provided by dl-DataToUL-ACK |
|  |  | '111' | $8^{th}$ value provided by dl-DataToUL-ACK |

For a PUCCH transmission with HARQ-ACK information, a UE determines a PUCCH resource after determining a set of PUCCH resources for $O_{UCI}$ HARQ-ACK information bits, as described in Subclause 9.2.1. The PUCCH resource determination is based on a PUCCH resource indicator field [5, TS 38.212] in a last DCI format 1_0 or DCI format 1_1, among the DCI formats 1_0 or DCI formats 1_1 that have a value of a PDSCH-to-HARQ_feedback timing indicator field indicating a same slot for the PUCCH transmission, that the UE detects and for which the UE transmits corresponding HARQ-ACK information in the PUCCH where, for PUCCH resource determination, detected DCI formats are first indexed in an ascending order across serving cells indexes for a same PDCCH monitoring occasion and are then indexed in an ascending order across PDCCH monitoring occasion indexes.

The PUCCH resource indicator field values map to values of a set of PUCCH resource indexes, as defined in Table 9.2.3-2, provided by ResourceList for PUCCH resources from a set of PUCCH resources provided by PUCCH-ResourceSet with a maximum of eight PUCCH resources. For the first set of PUCCH resources and when the size $R_{PUCCH}$ of resourceList is larger than eight, when a UE provides HARQ-ACK information in a PUCCH transmission in response to detecting a last DCI format 1_0 or DCI format 1_1 in a PDCCH reception, among DCI formats 1_0 or DCI formats 1_1 with a value of the PDSCH-to-HARQ_feedback timing indicator field indicating a same slot for the PUCCH transmission, the UE determines a PUCCH resource with index $r_{PUCCH}$, $0 \leq r_{PUCCH} \leq R_{PUCCH} - 1$, as $$r_{PUCCH} = \begin{cases} \left\lfloor \frac{n_{CCE,p} \cdot \lceil R_{PUCCH}/8 \rceil}{N_{CCE,p}} \right\rfloor + \Delta_{PRI} \cdot \left\lceil \frac{R_{PUCCH}}{8} \right\rceil & \text{if } \Delta_{PRI} < R_{PUCCH} \bmod 8 \\ \left\lfloor \frac{n_{CCE,p} \cdot \lfloor R_{PUCCH}/8 \rfloor}{N_{CCE,p}} \right\rfloor + \Delta_{PRI} \cdot \left\lfloor \frac{R_{PUCCH}}{8} \right\rfloor + R_{PUCCH} \bmod 8 & \text{if } \Delta_{PRI} \geq R_{PUCCH} \bmod 8 \end{cases}$$

where $N_{CCE,p}$ is a number of CCEs in CORESET p of the PDCCH reception for the DCI format 1_0 or DCI format 1_1 as described in Subclause 10.1, $n_{CCE,p}$ is the index of a first CCE for the PDCCH reception, and $\Delta_{PRI}$ is a value of the PUCCH resource indicator field in the DCI format 1_0 or DCI format 1_1.

TABLE 9.2.3-2

Mapping of PUCCH resource indication field values to a PUCCH resource in a PUCCH resource set with maximum 8 PUCCH resources

| PUCCH resource indicator | PUCCH resource |
|---|---|
| '000' | $1^{st}$ PUCCH resource provided by pucch-ResourceId obtained from the $1^{st}$ value of resourceList |
| '001' | $2^{nd}$ PUCCH resource provided by pucch-ResourceId obtained from the $2^{nd}$ value of resourceList |
| '010' | $3^{rd}$ PUCCH resource provided by pucch-ResourceId obtained from the $3^{rd}$ value of resourceList |
| '011' | $4^{th}$ PUCCH resource provided by pucch-ResourceId obtained from the $4^{th}$ value of resourceList |
| '100' | $5^{th}$ PUCCH resource provided by pucch-ResourceId obtained from the $5^{th}$ value of resourceList |
| '101' | $6^{th}$ PUCCH resource provided by pucch-ResourceId obtained from the $6^{th}$ value of resourceList |
| '110' | $7^{th}$ PUCCH resource provided by pucch-ResourceId obtained from the $7^{th}$ value of resourceList |
| '111' | $8^{th}$ PUCCH resource provided by pucch-ResourceId obtained from the $8^{th}$ value of resourceList |

Some or all of the following terminology and assumptions may be used hereafter.

Base station (BS): a network central unit and/or a network node in NR which is used to control one or more transmission and reception points (TRPs) which are associated with one or more cells. Communication between BS and TRP(s) may be via fronthaul. BS may be referred to as central unit (CU), evolved NodeB (eNB), next generation NodeB (gNB) and/or NodeB.

Cell: a cell may comprise one or more associated TRPs. For example, coverage of the cell is composed of coverage of the one or more associated TRP(s). One cell may be controlled by one BS. Cell may be referred to as TRP group (TRPG).

NR-PDCCH: NR-PDCCH is a channel that may carry a downlink control signal which is used to control communication between a UE and a network side. A network may transmit NR-PDCCH on a configured control resource set (CORESET) to the UE.

Uplink-control signal (UL-control signal): An UL-control signal may be a scheduling request (SR), channel state information (CSI) and/or HARQ-ACK/negative acknowledgement (NACK) for downlink transmission.

Slot: A slot may be a scheduling unit in NR. Slot duration (e.g., a duration of a slot) is 14 Orthogonal Frequency Division Multiplexing (OFDM) symbols.

Downlink common signal (DL common signal): A DL common signal may be a data channel carrying common information that targets multiple UEs in a cell or all UEs in a cell. Examples of a DL common signal include, but are not limited to, system information, paging, Random Access Response (RAR), etc.

For UE side:

There are at least two UE (RRC) states: connected state (also called active state) and non-connected state (also called inactive state and/or idle state). Inactive state may be an additional state and/or may belong to connected state and/or non-connected state.

For LTE/LTE-A V2X and/or Pedestrian-to-Everything (P2X) transmission, there are two transmission modes: one is scheduled via network, such as sidelink transmission mode 3, as described in 3GPP TS 36.212 V15.2.1; another one is sensing-based transmission, such as sidelink transmission mode 4, as described in 3GPP TS 36.212 V15.2.1. Since the sensing-based transmission is not scheduled via network, the UE may perform sensing before selecting a resource for transmission, in order to avoid resource collision and interference from and/or in other UEs.

For sidelink transmission mode 3, a network node may transmit a sidelink grant (SL grant), such as DCI format 5A in LTE/LTE-A, on a Uu interface for scheduling PSCCH and/or PSSCH. A V2X UE may perform PSCCH and/or PSSCH (e.g., the V2X UE may transmit PSCCH and/or PSSCH) on a PC5 interface, in response to the received SL grant and/or the received DCI format 5A (e.g., the V2X UE may transmit PSCCH and/or PSSCH on the PC5 interface responsive to receiving the SL grant and/or the DCI format 5A). The Uu interface corresponds to a wireless interface for communication between a network and a UE. The PC5 interface corresponds to a wireless interface for communication between UEs.

A DCI format 5A may schedule one transmission occasion of PSCCH and/or PSSCH, wherein the DCI format 5A is with CRC scrambled via sidelink V2X Radio Network Temporary Identifier (SL-V-RNTI). Alternatively and/or additionally, the DCI format 5A may schedule semi-persistent periodic transmission occasions of PSCCH and/or PSSCH, wherein the DCI format 5A is with CRC scrambled via Semi-Persistent Scheduling (SPS) V2X Radio Network Temporary Identifier (RNTI) (SL-SPS-V-RNTI).

For one transmission occasion, the UE may perform a PSSCH transmission (e.g., a new PSSCH transmission) and/or a PSSCH retransmission for a transport block. For n transmission occasions, the UE may perform n PSSCH transmissions (e.g., n new PSSCH transmissions) and/or n PSSCH retransmissions for n transport blocks.

In NR V2X, at least two sidelink resource allocation modes are defined for NR-V2X sidelink communication. The at least two sidelink resource allocation modes may comprise NR V2X/SL mode 1 and NR V2X/SL mode 2. The sidelink transmission mode 3 in LTE V2X may be a start point and/or basis for studying the NR V2X/SL mode 1. The sidelink transmission mode 4 in LTE V2X may be a start point or basis for studying the NR V2X/SL mode 2.

Support for HARQ feedback in NR V2X is considered due to high reliability requirements and/or high throughput requirements of NR V2X. For example, in an NR V2X system that provides support for HARQ feedback, a transmitting device transmits a first sidelink data transmission to a receiving device, and the receiving device may transmit HARQ feedback to the transmitting device. In an example where the HARQ feedback corresponds to ACK, the HARQ feedback may indicate that the receiving device receives and/or decodes the first sidelink data transmission successfully. In an example where the transmitting device receives the HARQ feedback corresponding to ACK, responsive to receiving the HARQ feedback, the transmitting device may transmit a second sidelink data transmission to the receiving device. In an example where the HARQ feedback corresponds to NACK, the HARQ feedback may indicate that the receiving device does not receive and/or decode the first sidelink data transmission successfully. In an example where the transmitting device receives the HARQ feedback corresponding to NACK, responsive to receiving the HARQ feedback, the transmitting device may retransmit the first sidelink data transmission to the receiving device. For example, the transmitting device may retransmit the first sidelink data transmission by transmitting a third sidelink data transmission comprising a data packet of the first sidelink data transmission. Since the third sidelink data transmission carries the same data packet as the first sidelink data transmission, the receiving device may combine the first sidelink data transmission and the third sidelink data transmission and perform decoding for the data packet based on the first sidelink data transmission and the third sidelink data transmission. Combining the first sidelink data transmission and the third sidelink data transmission and performing decoding for the data packet based on the first sidelink data transmission and the third sidelink data transmission can increase a possibility that the data packet is decoded successfully. For NR V2X/SL mode 1, since sidelink resource is scheduled by a network (e.g., gNB), if the transmitting device is required to perform a sidelink retransmission, it seems necessary that the transmitting device informs the network and/or requests one or more retransmission resources from the network (for performing the sidelink retransmission). The transmitting device and/or the receiving device may be a candidate for sending an indication to the network.

In Rel-15 NR (e.g., Release 15 of NR), a UE could be configured with one or more dl-DataToUL-ACK values. A dl-DataToUL-ACK value (e.g., k1) of the one or more dl-DataToUL-ACK values provides and/or indicates a slot offset between a slot for Physical Downlink Shared Channel (PDSCH) reception (and/or for reception of PDCCH indicating SPS release) and a slot for transmitting associated HARQ-ACK feedback (e.g., HARQ-ACK feedback associated with the PDSCH reception and/or reception of the PDCCH indicating SPS release). For a slot (e.g., slot #n), the UE may transmit one or more corresponding HARQ-ACKs as feedback, where a number associated with the one or more corresponding HARQ-ACKs (e.g., a number of bits of the one or more corresponding HARQ-ACKs and/or a number of HARQ-ACKs of the one or more corresponding HARQ-ACKs) is determined based on a number of one or more configured values of dl-DataToUL-ACK. For example, the UE could be configured with k1={0, 1, 2, 3, 4, 5, 6, 7}. The UE may transmit one or more HARQ-ACKs in slot #n where the one or more HARQ-ACKs correspond to one or more PDSCH receptions in one or more slots of slots #n−k1 (e.g., in the example where k1={0, 1, 2, 3, 4, 5, 6, 7}, slots #n−k1 may comprise slot #n−7, slot #n−6, etc.). However, for NR sidelink mode-1 (e.g., NR V2X/SL mode 1), there may not be a scheduled PDSCH as a referred slot for interpreting a dl-DataToUL-ACK value (e.g., k1) since the scheduled resource is changed from PDSCH to a sidelink resource. Hence, for NR sidelink mode-1, there is a need for suitable techniques for determining a Physical Uplink Control Channel (PUCCH) timing (e.g., a slot) for transmitting PUCCH that delivers an indication of a requirement and/or a need for a sidelink retransmission resource. At least some of the present disclosure provides for techniques that may be used for determining a PUCCH timing (e.g., a slot) for transmitting PUCCH that delivers an indication of a requirement and/or a need for a sidelink retransmission resource.

Alternatively and/or additionally, in Rel-15 NR, there are two types of HARQ-ACK codebooks comprising type 1 HARQ-ACK codebook and type 2 HARQ-ACK codebook. Type 1 HARQ-ACK codebook is semi-static codebook and type 2 HARQ-ACK codebook is dynamic codebook. The UE may be configured with one of the two types for HARQ-ACK feedback, such as either type 1 HARQ-ACK codebook or type 2 HARQ-ACK codebook. For type 1 HARQ-ACK codebook, HARQ-ACK bits in the codebook is determined based on a number or cardinality of monitoring occasions within a set of slots, wherein the set of slots is determined based on the configured dl-DataToUL-ACK. In an example, the UE may be configured with 8 values of dl-DataToUL-ACK. In this example, for a single cell, if a downlink slot provides a monitoring occasion, the HARQ-ACK bits in the codebook is 8. In other words, if the UE receives one or more PDSCHs in one or more slots associated with dl-DataToUL-ACK (and/or in a part of slots associated with dl-DataToUL-ACK), the HARQ-ACK codebook size may remain the same. For type 2 HARQ-ACK codebook, HARQ-ACK bits could be determined based on downlink assignment index (DAI) (e.g., counter DAI and/or total DAI).

Furthermore, in Rel-15 NR, resource allocation for PUCCH carrying one or more HARQ-ACKs in slot #n is determined based on at least Uplink Control Information (UCI) payload size (e.g., a number of HARQ-ACK bits) and/or a last received downlink assignment in slots #n−k1 (e.g., a most recently received downlink assignment in slots #n−k1). The last received downlink assignment may indicate a PUCCH resource offset (PRO) which may correspond to and/or generate a PUCCH resource index. For example, the PUCCH resource index may be determined and/or generated based on the PRO. A UE could be configured with up to 4 PUCCH resource sets (and/or up to a different number of PUCCH resource sets). The UE could determine and/or select a PUCCH resource set among the 4 PUCCH resource sets based on the UCI payload size. The UE could determine a PUCCH resource in the PUCCH resource set based on the generated PUCCH resource index. For type-1 HARQ-ACK codebook, if only 1 downlink assignment is received in slots #n−k1 with counter DAI value {1}, the UE determines the UCI payload size to be 1 bit. The UE could determine a PUCCH resource set based on the 1 bit, and/or the UE could determine a PUCCH resource based on the generated PUCCH resource index.

For NR V2X/SL mode 1, sidelink transmission is scheduled by a SL grant transmitted by a network. A transmitting device (in NR V2X/SL mode 1) may perform sidelink transmission based on the SL grant. For unicast sidelink transmission, the transmitting device may receive sidelink HARQ-ACK (SL HARQ-ACK) feedback corresponding to the sidelink transmission from a receiving device via a sidelink feedback channel. If the SL HARQ-ACK feedback indicates NACK or the transmitting device does not receive SL HARQ-ACK feedback, it may be required (and/or needed) that the receiving device and/or the transmitting device informs and/or requests the network to schedule a sidelink retransmission. In a scenario where the transmitting device informs and/or requests the network to schedule a sidelink retransmission, the transmitting device may transmit an indication (e.g., SL HARQ-ACK and/or SR) to the network for informing for sidelink retransmission. The indication may be transmitted on PUCCH or Physical Uplink Shared Channel (PUSCH). However, suitable techniques are not presently known and are needed for addressing scenarios where the transmitting device is required and/or configured to transmit HARQ-ACK for Uu interface and the indication (for PC5 interface) in a single slot, such as simultaneously. At least some of the present disclosure provides for techniques that may be used to address scenarios where the transmitting device is required and/or configured to transmit HARQ-ACK for Uu interface and the indication (for PC5 interface) in a single slot, such as simultaneously.

Figure 5:
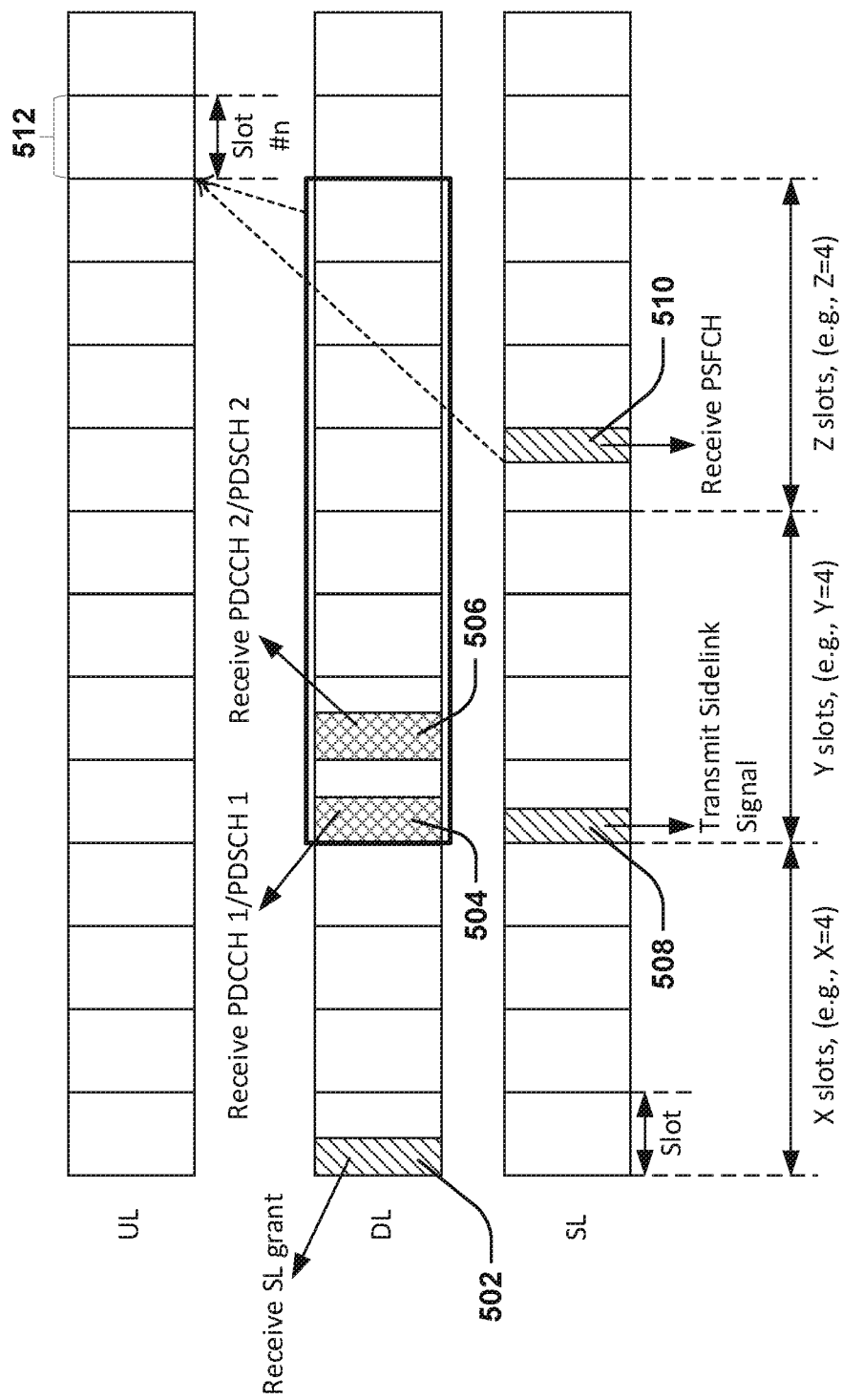
FIG. 5 is a diagram illustrating an exemplary scenario associated with transmissions and/or receptions of data by a device according to one exemplary embodiment.

FIG. 5 illustrates an exemplary scenario associated with the transmitting device. In some embodiments, a SL grant is received by the transmitting device in a time period 502. In some embodiments, the transmitting device performs a first sidelink transmission based on the SL grant. For example, the sidelink transmission may be performed by transmitting a sidelink signal in a time period 508. The sidelink signal may comprise sidelink data, sidelink control data and/or a SCI. The transmitting device may receive a Physical Sidelink Feedback Channel (PSFCH), associated with the sidelink transmission, in a time period 510. In some embodiments, the PSFCH comprises feedback associated with the sidelink transmission, such as a SL HARQ-ACK feedback. In some embodiments, a PDCCH 1 and/or a PDSCH 1 is received by the transmitting device in a time period 504. In some embodiments, a PDCCH 2 and/or a PDSCH 2 is received by the transmitting device in a time period 506.

In some embodiments, the transmitting device is indicated, instructed, required and/or configured to transmit an indication, such as a SL HARQ-ACK, on Uu interface in a slot 512 (e.g., slot #n). In some embodiments, the indication is associated with the sidelink transmission and/or the PSFCH. In some embodiments, the transmitting device is indicated, instructed, required and/or configured to transmit one or more HARQ-ACKs associated with Uu interface in the slot 512. In some embodiments, the one or more HARQ-ACKs are associate with the PDCCH 1, the PDSCH 1, the PDCCH 2 and/or the PDSCH 2. In the exemplary scenario of FIG. 5, a resource in the slot 512 for transmitting the indication may be overlapped (e.g., timely overlapped) with a resource in the slot 512 for transmitting the one or more HARQ-ACKs associated with Uu interface.

One or more techniques are provided herein that provide solutions to one or more of the foregoing situations, such as a situation where a device is indicated, instructed and/or configured to perform multiple transmissions to a network in a same slot and/or simultaneously (e.g., the multiple transmissions may comprise one or more SL HARQ-ACKs for scheduling a sidelink retransmission and one or more HARQ-ACKs associated with Uu interface).

In a first concept of the present disclosure, a network configures and/or indicates a first resource for one or more HARQ-ACKs associated with Uu interface and/or a second resource for one or more SL HARQ-ACKs, wherein the first resource is separated and/or orthogonal from the second resource. A HARQ-ACK associated with Uu interface may correspond to HARQ-ACK feedback associated with information received and/or decoded by a device via Uu interface. In some embodiments, the first resource is separated from the second resource in time domain. In some embodiments, the first resource and the second resource may be in a slot. In some embodiments, the transmitting device may transmit a first resource for one or more HARQ-ACKs associated with Uu interface and a second resource for one or more SL HARQ-ACKs, wherein the first resource and the second resource are in a same slot and are separated in time domain. In some embodiments, the first resource and the second resource occupy distinct and/or non-overlapped symbols within the slot (e.g., the first resource may occupy one or more first symbols in the slot and the second resource may occupy one or more second symbols in the slot, where the one or more first symbols are distinct and/or separate from the one or more second symbols).

In a second concept of the present disclosure, a transmitting device multiplexes one or more SL HARQ-ACKs and one or more HARQ-ACKs associated with Uu interface in a resource in a slot. In other words, the transmitting device determines a set of occasions for candidate PDSCH receptions (and/or for receptions of PDCCH indicating SPS release) and/or candidate SL grant receptions for which the transmitting device can transmit corresponding HARQ-ACK information, comprising one or more SL HARQ-ACKs and/or one or more HARQ-ACKs associated with Uu interface, in the resource in the slot.

In a third concept of the present disclosure, a receiving device multiplexes one or more SL HARQ-ACKs and one or more HARQ-ACKs associated with Uu interface in a resource in a slot. In other words, the receiving device determines a set of occasions for candidate PDSCH receptions (and/or for receptions of PDCCH indicating SPS release) and/or candidate sidelink receptions for which the receiving device can transmit corresponding HARQ-ACK information, comprising one or more SL HARQ-ACKs and/or one or more HARQ-ACKs associated with Uu interface, in the resource in the slot. In some embodiments, a sidelink reception may correspond to a reception of PSCCH and/or PSSCH.

Embodiment 1

A network configures a first device with a first resource set and a second resource set in a slot. In some embodiments, the first resource set is indicative of resources used to transmit one or more HARQ-ACKs associated with Uu interface. In some embodiments, the second resource set is indicative of resources used to transmit one or more SL HARQ-ACKs. In some embodiments, the first resource set is separated in time domain from the second resource set (e.g., one or more resources indicated by the first resource set may be separate from one or more resources indicated by the second resource set). Alternatively and/or additionally, the first device may perform one or more transmissions of one or more SL HARQ-ACKs in a first resource among the first resource set and perform one or more transmissions of one or more HARQ-ACKs associated with Uu interface in a second resource among the second resource set, wherein the first resource and the second resource are in a same slot and are separated in time domain. In some embodiments, the first resource and the second resource occupy distinct and/or non-overlapped symbols within the slot.

Alternatively and/or additionally, the network configures a first device with a first resource set in a first slot for one or more HARQ-ACKs associated with Uu interface and/or a second resource set in a second slot for one or more SL HARQ-ACKs. In some embodiments, the first slot belongs to (and/or is within) a first set of slots and the second slot belongs to (and/or is within) a second set of slots. In some embodiments, a slot of the first set of slots is different than slots of the second set of slots. In some embodiments, each slot of the first set of slots is different than every slot of the second set of slots. In some embodiments, the first slot is different than the second slot. In some embodiments, slots of the first set of slots are used for the first device to transmit one or more HARQ-ACKs associated with Uu interface. In some embodiments, slots of the second set of slots are used for the first device to transmit one or more SL HARQ-ACKs. In some embodiments, the network is not allowed and/or is not configured to configure and/or schedule HARQ-ACK feedback associated with Uu interface in a slot of the second set of slots (e.g., the network is prevented and/or prohibited from configuring and/or scheduling one or more HARQ-ACKs associated with Uu interface feedback in a slot of the second set of slots). For example, the network may not configure and/or schedule HARQ-ACK feedback associated with Uu interface in a slot of the second set of slots. In some embodiments, the network is not allowed and/or is not configured to configure and/or schedule SL HARQ-ACK in a slot of the first set of slots (e.g., the network is prevented and/or prohibited from configuring and/or scheduling one or more HARQ-ACKs associated with Uu interface feedback in a slot of the second set of slots). For example, the network may not configure and/or schedule SL HARQ-ACK in a slot of the first set of slots.

Figure 6:
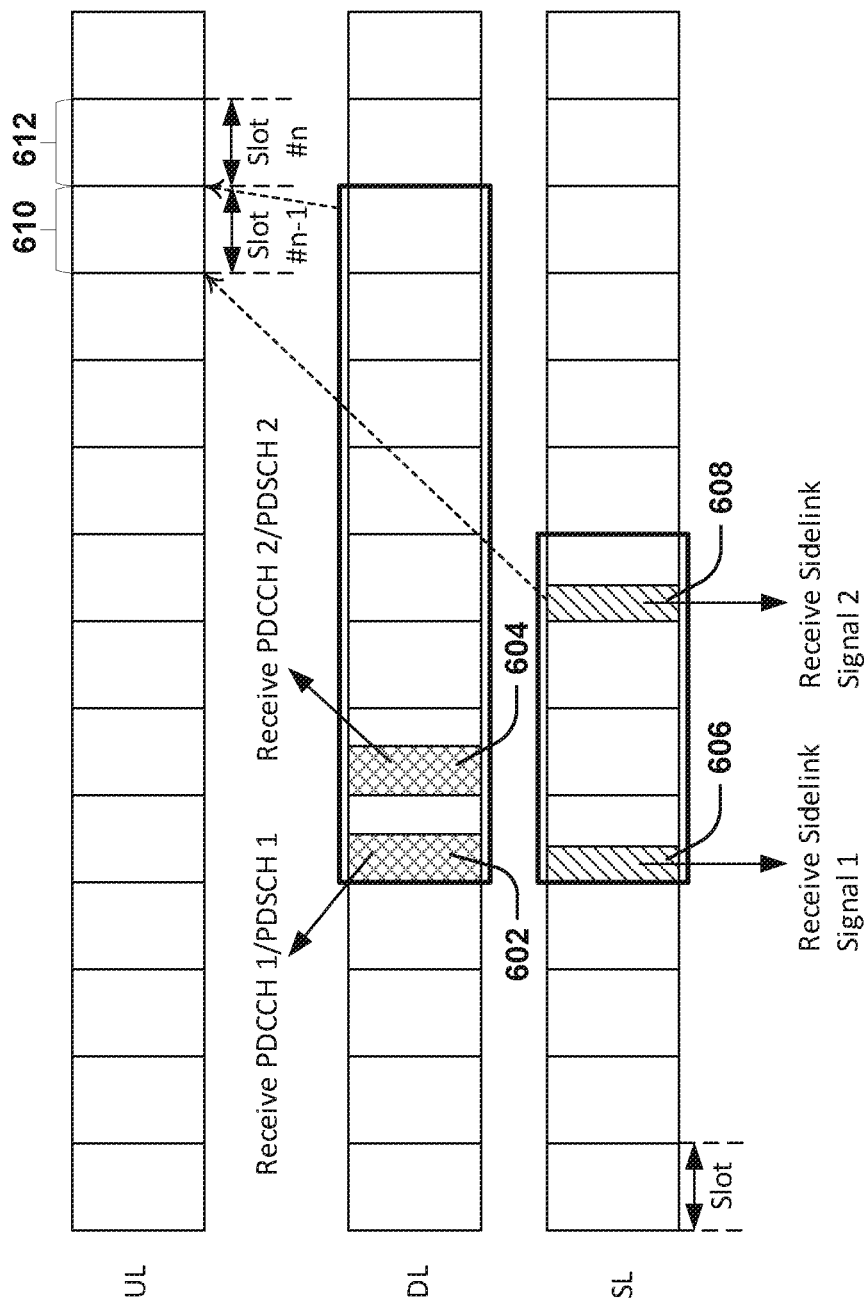
FIG. 6 is a diagram illustrating an exemplary scenario associated with transmissions and/or receptions of data by a device according to one exemplary embodiment.

FIG. 6 illustrates an exemplary scenario according to one or more embodiments of the present disclosure, such as Embodiment 1. In some embodiments, a PDCCH 1 and/or a PDSCH 1 is received by a first device in a time period 602. In some embodiments, a PDCCH 2 and/or a PDSCH 2 is received by the first device in a time period 604. In some embodiments, the PDCCH 1, the PDSCH 1, the PDCCH 2 and/or the PDSCH 2 correspond to downlink data, such as received via Uu interface. In some embodiments, the PDCCH 1 and/or the PDCCH 2 may be indicative of SPS release. In some embodiments, a sidelink signal 1, such as comprising sidelink data, sidelink control data, one or more SL HARQ-ACK feedbacks and/or a SCI, is received by the first device in a time period 606. In some embodiments, a sidelink signal 2, such as comprising sidelink data, sidelink control data, one or more SL HARQ-ACK feedbacks and/or a SCI, is received by the first device in a time period 608.

In some embodiments, a network may configure a first slot 610 for the first device for transmission of one or more SL HARQ-ACKs. In some embodiments, the network may configure a second slot 612 for the first device for transmission of one or more HARQ-ACKs associated with Uu interface. The first slot 610 may be separate from the second slot 612. For example, the first slot 610 may correspond to slot #n−1 and/or the second slot 612 may correspond to slot #n. The first device may transmit one or more SL HARQ-ACKs in the first slot 610. The one or more SL HARQ-ACKs may correspond to SL HARQ-ACK feedbacks associated with the sidelink signal 1 and/or the sidelink signal 2. The one or more SL HARQ-ACKs may correspond to the sidelink signal 1 and/or the sidelink signal 2. The first device may transmit one or more HARQ-ACKs associated with Uu interface in the second slot 612. In some embodiments, the one or more HARQ-ACKs associated with Uu interface may correspond to feedback associated with the PDCCH 1, the PDSCH 1, the PDCCH 2 and/or the PDSCH 2.

In some embodiments, the first device is configured with a first plurality of slot offsets (e.g., k1). In some embodiments, a slot offset in the first plurality of slot offsets provides a slot offset from a slot for PDSCH reception (and/or reception of a PDCCH indicating SPS release) to a slot for HARQ-ACK transmission. In an example, a slot offset in the first plurality of slot offsets provides a slot offset from a slot within which the PDCCH 1 and/or the PDSCH 1 are received to the second slot 612 (e.g., the slot within which the PDCCH 1 and/or the PDSCH 1 are received may correspond to a slot comprising the time period 602). In another example, a slot offset in the first plurality of slot offsets provides a slot offset from a slot within which the PDCCH 2 and/or the PDSCH 2 are received to the second slot 612 (e.g., the slot within which the PDCCH 2 and/or the PDSCH 2 are received may correspond to a slot comprising the time period 604).

In some embodiments, the first device is configured with a second plurality of slot offsets (e.g., k3). In some embodiments, a slot offset in the second plurality of slot offsets provides a slot offset from a slot for SL grant reception to a slot for transmitting a received/derived/determined SL HARQ-ACK to the network. In some embodiments, the SL grant reception may correspond to reception of a SL grant by the first device that grants one or more sidelink resources for a sidelink transmission by the first device. The first device may perform the sidelink transmission using the one or more sidelink resources. In some embodiments, the received/derived/determined SL HARQ-ACK may be associated with the sidelink transmission. In some embodiments, the sidelink signal 1 and/or the sidelink signal 2 may comprise the received SL HARQ-ACK feedback associated with the sidelink transmission. In some embodiments, the first device may transmit the received SL HARQ-ACK feedback in the first slot 610. In some embodiments, the first device may transmit the one or more SL HARQ-ACKs in the first slot, wherein the one or more SL HARQ-ACKs are derived/determined based on received SL HARQ-ACK feedbacks. In an example, a slot offset in the second plurality of slot offsets provides a slot offset from a slot within which the SL grant is received to the first slot 610. In some embodiments, the network could indicate one slot offset in the SL grant. In some embodiments, for a single serving cell, the first device could be configured with (only) one slot offset in the second plurality of slot offsets.

Alternatively and/or additionally, a slot offset in the second plurality of slot offsets provides a slot offset from a slot for sidelink transmission based on the SL grant to a slot for transmitting the received/derived/determined SL HARQ-ACK to the network. In an example, a slot offset in the second plurality of slot offsets provides a slot offset from a slot within which the sidelink transmission is performed to a slot for transmitting the received/derived/determined SL HARQ-ACK, such as the first slot 610.

Alternatively and/or additionally, a slot offset in the second plurality of slot offsets provides a slot offset from a slot for SL HARQ-ACK feedback reception corresponding to the sidelink transmission to a slot for transmitting the received/derived/determined SL HARQ-ACK to the network. In an example, a slot offset in the second plurality of slot offsets provides a slot offset from a slot within which the received SL HARQ-ACK feedback is received to a slot for transmitting the received/derived/determined SL HARQ-ACK, such as the first slot 610. Alternatively and/or additionally, a network is not allowed and/or is not configured to configure and/or schedule different and/or mixed types of HARQ-ACK(s) transmitted in a same slot (such as a SL HARQ-ACK and/or a HARQ-ACK associated with Uu interface in the same slot). For example, the network may not configure and/or schedule different and/or mixed types of HARQ-ACK(s) for transmission in a same slot.

Embodiment 2

A first device receives a SL grant (e.g., a DCI scheduling a sidelink transmission) from a network in a first slot. The first device performs a sidelink transmission based on the SL grant to a second device in a second slot.

In some embodiments, the first device receives a SL HARQ-ACK feedback, corresponding to the sidelink transmission, from the second device in a third slot. In some embodiments, the third slot may be different than the second slot. Alternatively and/or additionally, the third slot may be the same as the second slot.

In some embodiments, the first device is indicated, configured and/or instructed to transmit an indication for indicating a requirement for sidelink retransmission to the network in a fourth slot. The indication may be indicative of a requirement and/or a need for sidelink retransmission. For example, the indication may indicate that the first device is required to perform the sidelink retransmission. In some embodiments, the indication is the SL HARQ-ACK feedback (e.g., the indication comprises the SL HARQ-ACK feedback received from the second device). In some embodiments, the indication is derived/determined based on the SL HARQ-ACK feedback. In some embodiments, the indication is ACK if the SL HARQ-ACK feedback is ACK. In some embodiments, the indication is NACK if the SL HARQ-ACK feedback is NACK or Discontinuous Transmission (DTX). In some embodiments, the indication is DTX if the SL HARQ-ACK feedback is NACK or DTX. In some embodiments, the first device is configured with a timing for transmitting the indication (e.g., the fourth slot). Alternatively and/or additionally, the timing is indicated to the first device. In some embodiments, the timing is indicated and/or configured via the SL grant. For example, the SL grant is indicative of the timing.

In some embodiments, for the fourth slot, the first device is instructed, indicated and/or required by the network to transmit one or more HARQ-ACKs for one or more candidate PDSCH receptions (and/or one or more receptions of PDCCH indicating SPS release).

In some embodiments, the first device transmits the indication (e.g., the SL HARQ-ACK) and/or the one or more HARQ-ACKs on a first resource in the fourth slot.

In some embodiments, the first device determines a number of HARQ-ACK bits based on a first set of occasions (e.g., a first set of one or more occasions) and a second set of occasions (e.g., a second set of one or more occasions). In some embodiments, the first set of occasions is used to determine a first number of HARQ-ACK bits for one or more candidate PDSCH receptions (and/or one or more receptions of PDCCH indicating SPS release). In some embodiments, the second set of occasions is used to determine a second number of HARQ-ACK bits for the indication. In some embodiments, the second set of occasions is used to determine the second number of HARQ-ACK bits for SL HARQ-ACK (e.g., the second number of HARQ-ACK bits may correspond to a number of SL HARQ-ACK bits).

In some embodiments, the fourth slot is slot #n.

In some embodiments, the first device is configured with a first plurality of slot offsets (e.g., k1). In some embodiments, a slot offset in the first plurality of slot offsets provides a slot offset from a slot for PDSCH reception (and/or reception of PDCCH indicating SPS release) to a slot for HARQ-ACK transmission. In some embodiments, the network could indicate a slot offset by a DCI (DCI format 0_1 and/or DCI format 1_1).

In some embodiments, the first device is configured with a second plurality of slot offsets (e.g., k3). In some embodiments, a slot offset in the second plurality of slot offsets provides a slot offset from a slot for SL grant reception to a slot for transmitting the received/derived/determined SL HARQ-ACK to the network. In some embodiments, the network could indicate one slot offset in the SL grant. In some embodiments, for a single serving cell, the first device could be configured with (only) one slot offset in the second plurality of slot offsets.

Alternatively and/or additionally, a slot offset in the second plurality of slot offsets provides a slot offset from a slot for sidelink transmission based on the SL grant to a slot for transmitting the received/derived/determined SL HARQ-ACK to the network.

Alternatively and/or additionally, a slot offset in the second plurality of slot offsets provides a slot offset from a slot for SL HARQ-ACK feedback reception corresponding to the sidelink transmission to a slot for transmitting the received/derived/determined SL HARQ-ACK to the network.

In some embodiments, the first set of occasions is used for candidate PDSCH receptions (and/or receptions of PDCCH indicating SPS release). In some embodiments, the first set of occasions is determined based on slots, wherein the slots are prior to the fourth slot with the first plurality of slot offsets.

In some embodiments, the second set of occasions is used for candidate SL grant reception (e.g., the first slot). In some embodiments, the second set of occasions is used for candidate sidelink transmission (e.g., the second slot). In some embodiments, the second set of occasions is used for candidate SL HARQ-ACK feedback reception (e.g., the third slot).

In some embodiments, the second set of occasions is determined based on slots, wherein the slots are prior to the fourth slot with the second plurality of slot offsets.

In some embodiments, the first device could be configured with a plurality of resource sets having up to a number of resource sets, wherein a resource set comprises at least one resource for transmitting one or more HARQ-ACKs.

In some embodiments, the number is 4.

In some embodiments, the first device determines a resource set among the plurality of resource sets based on the number of HARQ-ACK bits and/or the first number of HARQ-ACK bits.

In some embodiments, the first device receives a DCI indicating HARQ-ACK feedback in the fourth slot (e.g., slot #n) (e.g., the DCI may be indicative of transmission of HARQ-ACK feedback in the fourth slot).

In some embodiments, the first device receives a DCI, which is the last (received) DCI (e.g., most recently received DCI) in time domain, indicating HARQ-ACK feedback in the fourth slot (e.g., slot #n) (e.g., the DCI may be indicative of transmission of HARQ-ACK feedback in the fourth slot).

In some embodiments, the DCI indicates a resource offset (e.g., PRO) for generating a resource index.

In some embodiments, the first device determines the first resource based on the resource index and the number of HARQ-ACK bits and/or the first number of HARQ-ACK bits.

In some embodiments, the first device receives a first DCI which is the last received DCI in time domain (e.g., the first DCI is a most recently received DCI), which indicates transmission of one or more HARQ-ACKs (associated with Uu interface) to the network in the fourth slot. In some embodiments, the first DCI schedules PDSCH.

In some embodiments, the first DCI indicates a first resource offset (e.g., PRO) for generating a first resource index.

In some embodiments, the first device determines the first resource based on the first resource index and the number of HARQ-ACK bits and/or the first number of HARQ-ACK bits.

In some embodiments, the first device receives a second DCI which is the last received SL grant in time domain (e.g., the second DCI is a most recently received SL grant), which indicates transmission of one or more SL HARQ-ACKs to the network in the fourth slot. In some embodiments, the second DCI schedules one or more sidelink resources.

In some embodiments, the second DCI indicates a second resource offset (e.g., PRO) for generating a second resource index.

In some embodiments, the first device determines the first resource based on the second resource index and a number of SL HARQ-ACK bits, such as the second number of HARQ-ACK bits.

In some embodiments, for unicast sidelink transmission in network scheduling mode (e.g., NR V2X/SL mode 1), timing for receiving a SL grant (e.g., the first slot) and timing for transmitting the SL HARQ-ACK (e.g., the fourth slot) is one to one mapping (e.g., the timing for receiving the SL grant and the timing for transmitting the SL HARQ-ACK are related to each other in a one to one mapping). Alternatively and/or additionally, timing for performing sidelink transmission based on the SL grant (e.g., the timing corresponds to the second slot) and timing for transmitting the SL HARQ-ACK (e.g., the fourth slot) is one to one mapping. Alternatively and/or additionally, timing for SL HARQ-ACK feedback reception corresponding to the sidelink transmission (e.g., the third slot) and timing for transmitting the SL HARQ-ACK (e.g., the fourth slot) is one to one mapping. In some embodiments, the first device does not expect to receive another SL grant indicating feedback of SL HARQ-ACK in the fourth slot. In some embodiments, if the first device is configured with a single cell, cardinality of the second set of occasions may be 1.

In some embodiments, a counter DAI is indicated for downlink assignment (and/or SPS release) in one or more slots of slots #n−k1 and SL grant in one or more slots of slots #n−k3.

In some embodiments, a DCI (e.g., downlink assignment) indicates the counter DAI.

In some embodiments, the counter DAI is accumulative based on ascending order of receiving time.

In some embodiments, the counter DAI indicates an accumulative number of downlink assignments in one or more slots of slots #n−k1 and SL grants in one or more slots of slots #n−k3.

Figure 7:
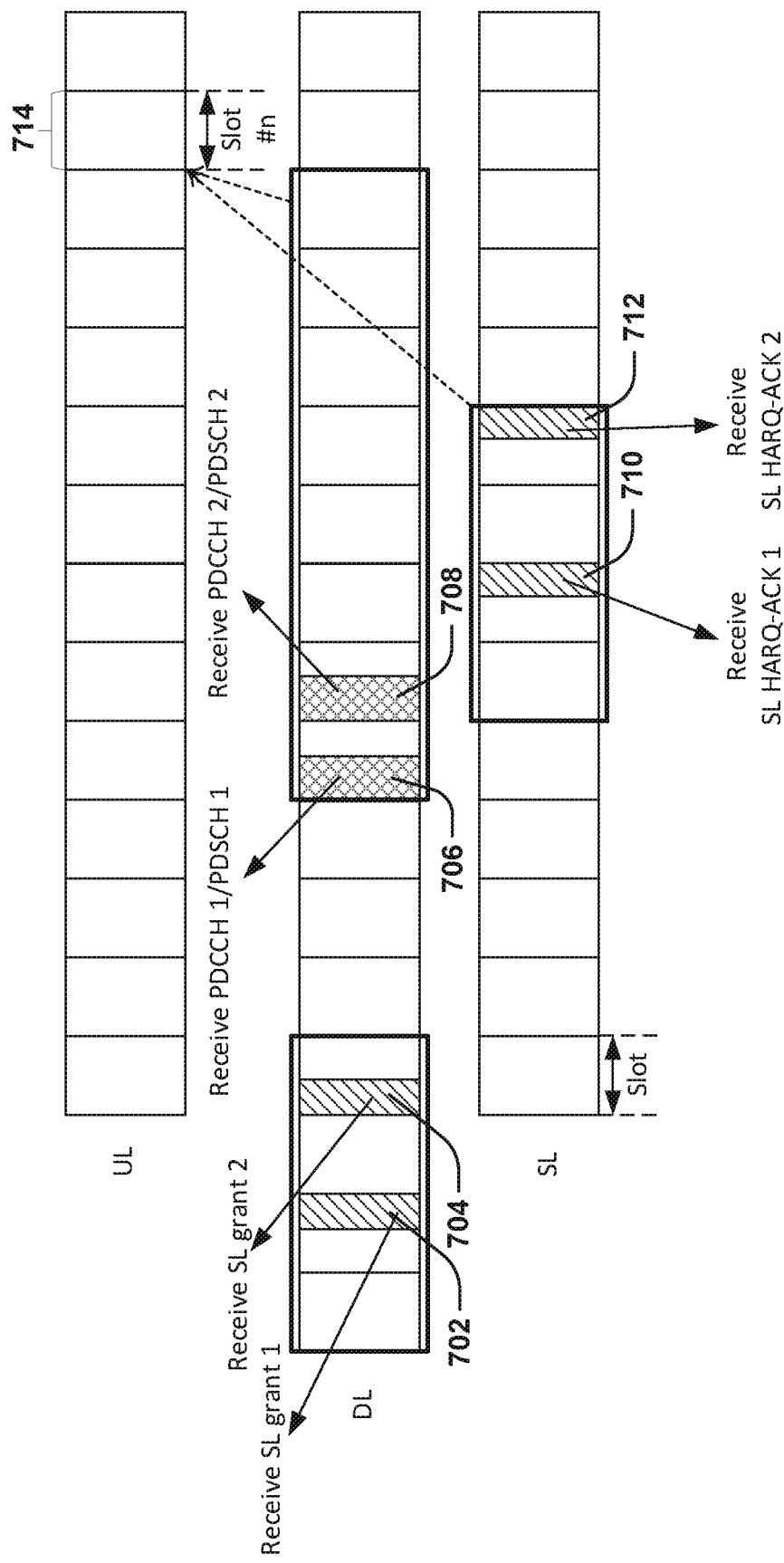
FIG. 7 is a diagram illustrating an exemplary scenario associated with transmissions and/or receptions of data by a device according to one exemplary embodiment.

FIG. 7 illustrates an exemplary scenario according to one or more embodiments of the present disclosure, such as Embodiment 2. In some embodiments, a SL grant 1 is received by the first device in a time period 702. In some embodiments, the first device performs a first sidelink transmission based on the SL grant 1 (e.g., the SL grant 1 may schedule the first sidelink transmission). In some embodiments, a SL grant 2 is received by the first device in a time period 704. In some embodiments, the first device performs a second sidelink transmission based on the SL grant 2 (e.g., the SL grant 2 may schedule the second sidelink transmission). In some embodiments, the first device receives a SL HARQ-ACK feedback 1, associated with the first sidelink transmission, in a time period 710. In some embodiments, the first device receives a SL HARQ-ACK feedback 2, associated with the second sidelink transmission, in a time period 712. In some embodiments, a PDCCH 1 and/or a PDSCH 1 are received by the first device in a time period 706. In some embodiments, a PDCCH 2 and/or a PDSCH 2 are received by the first device in a time period 708. In some embodiments, the first device may transmit, and/or may be required and/or configured to transmit, one or more HARQ-ACKs associated with Uu interface in a first slot 714, such as slot #n. In some embodiments, the first device may transmit, and/or may be required and/or configured to transmit, one or more SL HARQ-ACKs, such as the SL HARQ-ACK feedback 1 and/or the SL HARQ-ACK feedback 2, or SL HARQ-ACK 1 derived/determined based on SL HARQ feedback 1 and/or SL HARQ-ACK 2 derived/determined based on SL HARQ feedback 2, in the first slot 714.

In some embodiments, the first device is configured with k1={1, 2, 3, 4, 5, 6, 7, 8} corresponding to a first plurality of slot offsets. A slot offset of k1 is between a slot for candidate PDSCH reception (and/or reception of PDCCH indicating SPS release) and a slot for HARQ-ACK transmission. In an example, a slot offset of k1 is between a slot comprising the time period 706 (associated with receiving the PDCCH 1 and/or the PDSCH 1) and the first slot 714. The first device is configured with a type-1 HARQ-ACK codebook. The first device is configured with sidelink network scheduling mode (e.g., NR V2X/SL mode 1). In some embodiments, the first device could be configured with k3={12, 13, 14, 15} corresponding to a second plurality of slot offsets. A slot offset of k3 is between a slot for candidate SL grant reception and a slot for transmitting a received SL HARQ-ACK (such as the SL HARQ-ACK 1 and/or the SL HARQ-ACK 2). In an example, a slot offset of k3 is between a slot comprising the time period 702 associated with receiving the SL grant 1 and the first slot 714 for transmitting the SL HARQ-ACK 1. Alternatively and/or additionally, k3={4, 5, 6, 7}, wherein a slot offset of k3 is between a slot for receiving SL HARQ-ACK feedback and a slot for transmitting the received/derived/determined SL HARQ-ACK. In an example, a slot offset of k3 is between a slot comprising the time period 710 associated with receiving the SL HARQ-ACK feedback 1 and the first slot 714 for transmitting the SL HARQ-ACK 1 derived/determined based on SL HARQ-ACK feedback 1.

In some embodiments, the device is configured with a single cell. In some embodiments, each slot #n−k1 (e.g., slot #n−1, slot #n−2, slot #n−3, . . . , slot #n−8 where k1={1, 2, 3, 4, 5, 6, 7, 8}) has a candidate occasion for PDSCH reception (and/or PDCCH indicating SPS release). In some embodiments, each slot #n−k3 (e.g., slot #n−12, slot #n−13, slot #n−14, slot #n−15 where k3={12, 13, 14, 15}) has a candidate occasion for receiving a SL grant. Alternatively and/or additionally, each slot #n−k3 (e.g., slot #n−4, slot #n−5, slot #n−6, slot #n−7 where k3={4, 5, 6, 7}) has a candidate occasion for receiving a SL HARQ-ACK feedback. In an example, the first device transmits 12 bits on a PUCCH resource in the first slot 714, wherein 4 bits are associated with sidelink (e.g., 4 bits comprise one or more SL HARQ-ACKs, such as the SL HARQ-ACK 1 and/or the SL HARQ-ACK 2) and 8 bits are associated with Uu interface (e.g., 8 bits comprise one or more HARQ-ACKs associated with Uu interface). In some embodiments, the PUCCH resource is determined based on a last DCI (e.g., most recently received DCI) received within slots #n−k1 (e.g., slots #n−k1 may correspond to slot #n−1, slot #n−2, slot #n−3, . . . , slot #n−8) and/or slots #n−k3 (e.g., slots #n−k3 may correspond to slot #n−12, slot #n−13, slot #n−14, slot #n−15, where k3={12, 13, 14, 15}). In an example, the PDCCH 2 is the last received DCI. The PDCCH 2 may indicate the first slot 714 (e.g., slot #n) for transmission of feedback, such as one or more HARQ-ACKs associated with Uu interface and/or one or more SL HARQ-ACKs. In some embodiments, the PUCCH resource is determined based on the last received DCI. The last received DCI may indicate the first slot 714 (e.g., slot #n) for transmission of feedback, such as one or more HARQ-ACKs and/or one or more SL HARQ-ACKs. In some embodiments, a DCI could be a SL grant that schedules one or more sidelink resources for sidelink transmission and/or a downlink assignment that schedules one or more downlink resources for downlink reception.

In an example where SL HARQ-ACK 1 is ACK, SL HARQ-ACK 2 is ACK, HARQ-ACK for PDSCH 1 (and/or PDCCH 1 that indicates SPS release) is ACK and HARQ-ACK for PDSCH 2 (and/or PDCCH 2 that indicates SPS release) is ACK, the 12 bits comprise {1,1,0,0,0,0,0,0} for Uu interface feedback, followed by {0,1,0,1} for sidelink feedback.

In some embodiments, a counter DAI is indicated for downlink assignment in slots #n–k1 and for SL grant in slots #n–k3. In some embodiments, in FIG. 7, a counter DAI indicated by SL grant 1 may be {1}, a counter DAI indicated by SL grant 2 may be {2}, a counter DAI indicated by PDCCH 1 may be {3}, and a counter DAI indicated by PDCCH 2 may be {4}.

In some embodiments, in another example, if only one DCI (e.g., SL grant and/or downlink assignment) with a counter DAI equal to 0 is received in slots #n–k1 and/or slots #n–k3, the first device may transmit a 1 bit HARQ-ACK (e.g., the first device may transmit only the 1 bit HARQ-ACK regardless of 12 bits being fixed and/or configured). In some embodiments, if the first device receives (e.g., only receives) PDCCH 2 with a counter DAI value equal to {2}, the first device does not merely transmit a 1 bit HARQ-ACK (e.g., the first device may transmit one or more HARQ-ACKs with more than 1 bit). In some embodiments, if the first device receives (e.g., only receives) PDCCH 2 with a counter DAI value equal to {2}, the first device does not transmit a HARQ-ACK with merely 1 bit (e.g., the first device may transmit one or more HARQ-ACKs with more than 1 bit). In some embodiments, the first device transmits one or more HARQ-ACKs with 12 bits in slot #n.

FIG. 8 illustrates a table 800 comprising UCI payload sizes (e.g., numbers of HARQ-ACK bits) for a single cell, for type-1 HARQ-ACK codebook.

In some embodiments, the first device may be configured with 8 different k1 values and 4 different k3 values. For example, k1 (e.g., the first plurality of slot offsets) may comprise 8 slot offsets (e.g., 8 k1 values) and/or k3 (e.g., the second plurality of slot offsets) may comprise 4 slot offsets (e.g., 4 k3 values). Alternatively and/or additionally, k1 may comprise a number of k1 values different than 8 and/or k3 may comprise a number of k3 values different than 4.

In some embodiments, a slot of slots #n–k1 (and/or each slot of slots #n–k1) generates and/or corresponds to one occasion.

In some embodiments, k1 comprising 8 k1 values (e.g., 8 slot offsets) may correspond to and/or may refer to 8 occasions for HARQ-ACK feedback. For example, slots #n–k1 may generate and/or correspond to 8 occasions for HARQ-ACK feedback.

In some embodiments, a slot of slots #n–k3 (and/or each slot of slots #n–k3) generates and/or corresponds to one occasion.

In some embodiments, k3 comprising 4 k3 values (e.g., 4 slot offsets) may correspond to and/or may refer to 4 occasions for transmitting received/derived/determined SL HARQ-ACK feedback. For example, slots #n–k3 may generate and/or correspond to 4 occasions for transmitting received/derived/determined SL HARQ-ACK feedback.

In some embodiments, in the table 800, {0} in the left hand column denotes no SL grant receptions indicating HARQ-ACK to slot #n (e.g., no SL grant receptions indicative of HARQ-ACK transmission in slot #n is received by the first device).

In some embodiments, in the table 800, {0} in the top row denotes no downlink assignment indicating HARQ-ACK to slot #n (e.g., no downlink assignment indicative of HARQ-ACK transmission in slot #n is received by the first device).

In some embodiments, in the table 800, {1} (in the top row or the left hand column) denotes only one downlink assignment (with counter DAI value {1}) indicating HARQ-ACK to slot #n or only one SL grant reception (with counter DAI value {1}) indicating HARQ-ACK to slot #n.

In some embodiments, in the table 800, {1} in the left hand column denotes one SL grant reception (with counter DAI value {1}) indicating HARQ-ACK to slot #n (e.g., only one SL grant (with counter DAI value {1}) indicative of HARQ-ACK transmission in slot #n is received by the first device).

In some embodiments, in the table 800, {1} in the top row denotes one downlink assignment (with counter DAI value {1}) indicating HARQ-ACK to slot #n (e.g., only one downlink assignment (with counter DAI value {1}) indicative of HARQ-ACK transmission in slot #n is received by the first device).

In some embodiments, in the table 800, (1, X] in the top row denotes that the first device receives more than one and up to X downlink assignments indicating HARQ-ACK transmission in slot #n or that the first device receives only one downlink assignment (with counter DAI value other than {1}) indicating HARQ-ACK transmission in slot #n.

In some embodiments, in the table 800, (1, Y] in the left hand column denotes that the first device receives more than one and up to Y SL grants indicating HARQ-ACK transmission in slot #n or that the first device receives only one SL grant (with counter DAI value other than {1}) indicating HARQ-ACK transmission in slot #n.

In the exemplary scenario of FIG. 7, X may be 8 and Y may be 4 for a single cell.

In some embodiments, the table 800 may be extended to a scenario where the first device is configured with carrier aggregation and the first device generates a HARQ-ACK codebook for a configured and/or activated carrier and/or cell.

In some embodiments, for carrier aggregation, X is 8 multiplied by a number of cells (e.g., a number of configured and/or activated cells). For example, X may be equal to 8 multiplied by the number of cells in a scenario where the first device is configured with carrier aggregation.

In some embodiments, for carrier aggregation, Y is 4 multiplied by a number of cells (e.g., a number of configured and/or activated cells). For example, Y may be equal to 4 multiplied by the number of cells in a scenario where the first device is configured with carrier aggregation.

In some embodiments, the first device generates and/or determines the HARQ-ACK payload size equal to 1 if the first device receives only one DCI (e.g., an SL grant or a downlink assignment), with counter DAI value {1}, indicating HARQ-ACK transmission in slot #n.

In some embodiments, if the first device receives a SL grant, with counter DAI value other than {1}, indicating HARQ-ACK transmission in slot #n, the first device generates and/or determines the HARQ-ACK payload size equal to 12.

Alternatively and/or additionally, in a scenario where one SL grant (with counter DAI value {1}) indicative of HARQ-ACK transmission in slot #n is received by the first device and/or one downlink assignment (with counter DAI value {1}) indicative of HARQ-ACK transmission in slot #n is received by the first device, the first device generates 2 bits for HARQ-ACK feedback.

Figures 9, 10:
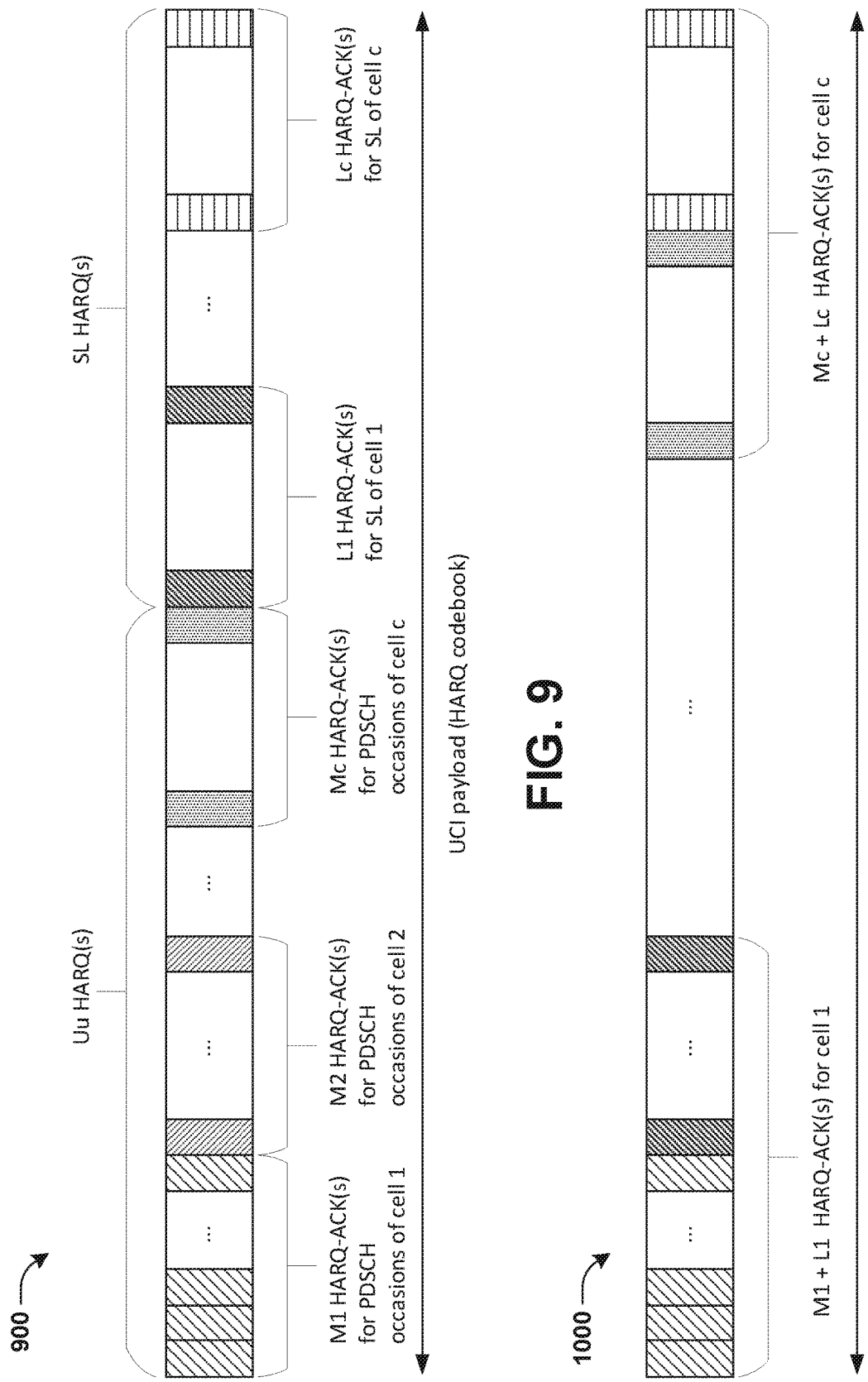
FIG. 9 is a diagram illustrating a UCI payload according to one exemplary embodiment.
FIG. 10 is a diagram illustrating a UCI payload according to one exemplary embodiment.

FIG. 9 illustrates a first exemplary UCI payload 900 according to some embodiments where the first device is configured with multiple cells (e.g., a number of cells). In some embodiments, the first exemplary UCI payload 900 is associated with a number of PUCCH resources.

FIG. 10 illustrates a second exemplary UCI payload 1000 according to some embodiments where the first device is configured with multiple cells (e.g., a number of cells). In some embodiments, the second exemplary UCI payload 1000 is associated with a number of PUCCH resources.

In some embodiments, the first device is instructed, indicated and/or configured to transmit UCI comprising one or more HARQ-ACKs and/or one or more SL HARQ-ACKs on a cell.

In some embodiments, the cell is a primary cell (PCell) and/or a primary secondary cell (PSCell).

In some embodiments, with respect to FIGS. 9-10, a first set of occasions associated with cell 1 comprises M1 occasions. Alternatively and/or additionally, a set of occasions associated with cell 2 comprises M2 occasions. Alternatively and/or additionally, a set of occasions associated with cell c comprises Mc occasions.

In some embodiments, M1 may be the same as Mx, where x=2, 3, . . . , c.

In some embodiments, with respect to FIGS. 9-10, a second set of occasions associated with cell 1 comprises L1 occasions. Alternatively and/or additionally, a set of occasions associated with cell 2 comprises L2 occasions. Alternatively and/or additionally, a set of occasions associated with cell c comprises Lc occasions.

In some embodiments, L1 may be the same as Lx, where x=2, 3, . . . , c.

In some embodiments, the first device is configured to perform sidelink transmission on cell x, wherein x=1, . . . , c.

In some embodiments, the first device generates a number associated with Uu HARQ-ACK(s), where the number is equal to a combination, such as a sum, of M1, . . . , Mc. A Uu HARQ-ACK may correspond to a HARQ-ACK associated with Uu interface (such as associated with a received PDSCH). In some embodiments, the number corresponds to a number of Uu HARQ-ACKs. For example, the first device generates M1+M2+ . . . +Mc Uu HARQ-ACK(s). In an example where c=3, the first device generates a M1+M2+M3 Uu HARQ-ACK(s) (e.g., the first device generates a number of Uu HARQ-ACK(s) equal to M1+M2+M3). Alternatively and/or additionally, the number corresponds to a number of Uu HARQ-ACK bits. In some embodiments, the first device generates M1+M2+ . . . +Mc Uu HARQ-ACK bits.

In some embodiments, the first device generates a number associated with SL HARQ-ACK(s), where the number is equal to a combination, such as a sum, of L1, . . . , Lc. In some embodiments, the number corresponds to a number of SL HARQ-ACKs. For example, the first device generates L1+L2+ . . . +Lc SL HARQ-ACK(s). In an example where c=3, the first device generates a L1+L2+L3 SL HARQ-ACK(s) (e.g., the first device generates a number of SL HARQ-ACK(s) equal to L1+L2+L3). Alternatively and/or additionally, the number corresponds to a number of SL HARQ-ACK bits. In some embodiments, the first device generates L1+L2+ . . . +Lc SL HARQ-ACK bits.

In some embodiments, one or more Uu HARQ-ACK bits and one or more SL HARQ-ACK bits are ordered and/or arranged (in a UCI payload) as shown in FIG. 9, such as in accordance with the first exemplary UCI payload 900. For example, one or more bits comprising one or more Uu HARQ-ACKs and/or one or more bits comprising one or more SL HARQ-ACKs are ordered and/or arranged (in the UCI payload) as shown in FIG. 9.

In some embodiments, the first device generates the UCI payload having one or more Uu HARQ-ACKs followed by one or more SL HARQ-ACKs.

In some embodiments, for one or more Uu HARQ-ACKs, the first device orders, generates, places and/or arranges one or more Mx HARQ-ACKs for cell x based on an ascending order of cell index. In an example, the UCI payload may have one or more M1 HARQ-ACKs, followed by one or more M2 HARQ-ACKs, followed by one or more M3 HARQ-ACKs, etc. based on cell indexes of cell 1 (associated with the one or more M1 HARQ-ACKs), cell 2 (associated with the one or more M2 HARQ-ACKs), cell 3 (associated with the one or more M3 HARQ-ACKs), etc.

In some embodiments, for one or more SL HARQ-ACKs, the first device orders, generates, places and/or arranges one or more Lx SL HARQ-ACKs for cell x based on an ascending order of cell index. In an example, the UCI payload may have one or more L1 SL HARQ-ACKs, followed by one or more L2 SL HARQ-ACKs, followed by one or more L3 SL HARQ-ACKs, etc. based on cell indexes of cell 1 (associated with the one or more L1 SL HARQ-ACKs), cell 2 (associated with the one or more L2 SL HARQ-ACKs), cell 3 (associated with the one or more L3 SL HARQ-ACKs), etc.

In some embodiments, the first device determines a resource based on at least a number of bits corresponding to a combination, such as a sum, of M1, . . . , Mc, L1, . . . , Lc. For example, the first device determines a resource based on at least M1+ . . . +Mc+L1+ . . . +Lc bits.

In some embodiments, Uu HARQ-ACK bits and SL HARQ-ACK bits may be ordered, generated, placed and/or arranged by first ordering and/or arranging the Uu HARQ-ACK bits and the SL HARQ-ACK bits based on types of HARQ-ACK (e.g., Uu HARQ-ACK or SL HARQ-ACK), then ordering and/or arranging the Uu HARQ-ACK bits and the SL HARQ-ACK bits based on cell index, then ordering and/or arranging the Uu HARQ-ACK bits and the SL HARQ-ACK bits based on slot index. For example, first, the Uu HARQ-ACK bits are ordered, generated, placed and/or arranged before and/or preceding the SL HARQ-ACK bits. Second, the Uu HARQ-ACK bits are ordered, generated, placed and/or arranged based on an ascending order of cell index (and/or a descending order of cell index) and/or SL HARQ-ACK bits are ordered, generated, placed and/or arranged based on an ascending order of cell index (and/or a descending order of cell index). Third, one or more Uu HARQ-ACK bits, associated with a cell (e.g., a single cell), are ordered, generated, placed and/or arranged based on an ascending order of slot index (and/or a descending order of slot index) and/or one or more SL HARQ-ACK bits, associated with a cell (e.g., a single cell), are ordered, generated, placed and/or arranged based on an ascending order of slot index (and/or a descending order of slot index). It may be appreciated that the described order of steps for ordering, generating, placing and/or arranging the Uu HARQ-ACK bits and SL HARQ-ACK bits in the UCI payload is merely exemplary and other embodiments having different orders of steps are contemplated.

In some embodiments, one or more Uu HARQ-ACK bits and one or more SL HARQ-ACK bits are ordered and/or arranged (in a UCI payload) as shown in FIG. 10, such as in accordance with the second exemplary UCI payload 1000. For example, one or more bits comprising one or more Uu HARQ-ACKs and/or one or more bits comprising one or more SL HARQ-ACKs are ordered and/or arranged (in the UCI payload) as shown in FIG. 10.

In some embodiments, the first device generates the UCI payload based on an ascending order of cell index (and/or a descending order of cell index).

In some embodiments, for Mx+Lx HARQ-ACK(s) for cell x, the first device orders, generates, places and/or arranges Mx HARQ-ACK(s) followed by Lx SL HARQ-ACK(s) in the UCI payload.

In some embodiments, the first device determines a resource based on at least M1+ . . . +Mc+L1+ . . . +Lc bits.

In some embodiments, Uu HARQ-ACK bits and SL HARQ-ACK bits may be ordered, generated, placed and/or arranged by first ordering and/or arranging the Uu HARQ-ACK bits and the SL HARQ-ACK bits based on cell index, then ordering and/or arranging the Uu HARQ-ACK bits and the SL HARQ-ACK bits based on types of HARQ-ACK (e.g., Uu HARQ-ACK or SL HARQ-ACK), then ordering and/or arranging the Uu HARQ-ACK bits and the SL HARQ-ACK bits based on slot index. For example, first, the Uu HARQ-ACK bits and/or the SL HARQ-ACK bits are ordered, generated, placed and/or arranged based on an ascending order of cell index (and/or a descending order of cell index). Second, one or more Uu HARQ-ACK bits and one or more SL HARQ-ACK bits associated with a cell (e.g., a single cell), are ordered, generated, placed and/or arranged based on types of HARQ-ACK (e.g., the one or more Uu HARK-ACK bits may be ordered, generated, placed and/or arranged before and/or preceding the one or more SL HARQ-ACK bits). Third, one or more Uu HARQ-ACK bits, associated with a cell (e.g., a single cell), are ordered, generated, placed and/or arranged based on an ascending order of slot index (and/or a descending order of slot index) and/or one or more SL HARQ-ACK bits, associated with a cell (e.g., a single cell), are ordered, generated, placed and/or arranged based on an ascending order of slot index (and/or a descending order of slot index). It may be appreciated that the described order of steps for ordering, generating, placing and/or arranging the Uu HARQ-ACK bits and SL HARQ-ACK bits in the UCI payload is merely exemplary and other embodiments having different orders of steps are contemplated.

In some embodiments, Uu HARQ-ACK bits and SL HARQ-ACK bits may be ordered, generated, placed and/or arranged by first ordering and/or arranging the Uu HARQ-ACK bits and the SL HARQ-ACK bits based on slot index, then ordering and/or arranging the Uu HARQ-ACK bits and the SL HARQ-ACK bits based on types of HARQ-ACK (e.g., Uu HARQ-ACK or SL HARQ-ACK), then ordering and/or arranging the Uu HARQ-ACK bits and the SL HARQ-ACK bits based on cell index. For example, first, the Uu HARQ-ACK bits and/or the SL HARQ-ACK bits are ordered, generated, placed and/or arranged based on an ascending order of slot index (and/or a descending order of slot index). Second, one or more Uu HARQ-ACK bits and one or more SL HARQ-ACK bits in a slot (e.g., a single slot), are ordered, generated, placed and/or arranged based on types of HARQ-ACK (e.g., the one or more Uu HARK-ACK bits may be ordered, generated, placed and/or arranged before and/or preceding the one or more SL HARQ-ACK bits). Third, one or more Uu HARQ-ACK bits, in a slot (e.g., a single slot), are ordered, generated, placed and/or arranged based on an ascending order of cell index (and/or a descending order of cell index) and/or one or more SL HARQ-ACK bits, in a slot (e.g., a single slot), are ordered, generated, placed and/or arranged based on an ascending order of cell index (and/or a descending order of cell index). It may be appreciated that the described order of steps for ordering, generating, placing and/or arranging the Uu HARQ-ACK bits and SL HARQ-ACK bits in the UCI payload is merely exemplary and other embodiments having different orders of steps are contemplated.

In some embodiments, the first device is instructed and/or indicated by a network to transmit one or more HARQ-ACKs corresponding to a first set for candidate PDSCH receptions in slot #n.

In some embodiments, the first device is instructed and/or indicated by the network to transmit one or more SL HARQ-ACKs to the network in slot #n, wherein the one or more SL HARQ-ACKs correspond to one or more sidelink transmissions scheduled by one or more SL grants received in a second set of occasions for candidate SL grant reception.

In some embodiments, in slot #n, the first device determines a resource for multiplexing the one or more HARQ-ACKs and the one or more SL HARQ-ACKs at least based on a first number associated with the one or more HARQ-ACKs and the one or more SL HARQ-ACKs. The first number may correspond to a number of the one or more HARQ-ACKs and/or a number of the one or more SL HARQ-ACKs (and/or a combination, such as a sum, of the number of the one or more HARQ-ACKs and the number of the one or more SL HARQ-ACKs). Alternatively and/or additionally, the first number may correspond to a number of bits of the one or more HARQ-ACKs and/or a number of bits of the one or more SL HARQ-ACKs (and/or a combination, such as a sum, of the number of bits of the one or more HARQ-ACKs and the number of bits of the one or more SL HARQ-ACKs)

In some embodiments, if the first device reports (and/or transmits) one or more HARQ-ACKs and/or one or more SL HARQ-ACKs only for a SL grant (with a counter DAI field value of 1) within the second set of occasions, or only for a PDSCH reception scheduled by a downlink assignment (with counter DAI field value of 1) within a first set of occasions, the first number is 1, otherwise, the first number is a combination, such as a sum, of a cardinality of the first set of occasions and a cardinality of the second set of occasions (e.g., the first number may be the cardinality of the first set of occasions plus the cardinality of the second set of occasions). In some embodiments, the first set of occasions may be for downlink assignments and/or for candidate PDSCH receptions.

In some embodiments, if the first device reports (and/or transmits) one or more HARQ-ACKs and/or one or more SL HARQ-ACKs only for a SL grant within the second set of occasions, or only for a PDSCH reception scheduled by a downlink assignment (with counter DAI field value of 1) within the first set of occasions, the first number is 1, otherwise, the first number is a combination, such as a sum, of a cardinality of the first set of occasions and a cardinality of the second set of occasions (e.g., the first number may be the cardinality of the first set of occasions plus the cardinality of the second set of occasions).

In some embodiments, the downlink assignment, with counter DAI field value of 1, within the first set of occasions is on the PCell.

In some embodiments, the SL grant, with counter DAI field value of 1, within the second set of occasions is on the PCell.

In some embodiments, the first device is configured with a semi-static HARQ-ACK codebook.

In some embodiments, there is one occasion within the second set of occasions and/or a cardinality of the second set of occasions is 1.

In some embodiments, there is more than one occasion within the second set of occasions.

In some embodiments, if the first device reports (and/or transmits) one or more HARQ-ACKs and/or one or more SL HARQ-ACKs only for a SL grant (with a counter DAI field value of 1) within the second set of occasions associated with the slot #n, the first device is indicated by the network to transmit one or more SL HARQ-ACKs to the network in slot #n and the first device is not indicated by the network to transmit one or more Uu HARQ-ACKs in slot #n. In some embodiments, the first device receives no PDSCH (e.g., the first device does not receive a PDSCH and/or the first device does not receive any PDSCH) in the first set of occasions associated with the slot #n. In some embodiments, the first device receives no other SL grant, other than the SL grant with counter DAI field value of 1, in the second set of occasions associated with the slot #n.

In some embodiments, if the first device reports (and/or or transmits) one or more HARQ-ACKs and/or one or more SL HARQ-ACKs only for a PDSCH reception scheduled by a downlink assignment, with counter DAI field value of 1, within the first set of occasions associated with the slot #n, the first device is indicated by the network to transmit one or more HARQ-ACKs to the network in slot #n and the first device is not indicated by the network to transmit one or more SL HARQ-ACKs in slot #n. In some embodiments, the first device receives no SL grant (e.g., the first device does not receive a SL grant and/or the first device does not receive any SL grants) in the second set of occasions associated with the slot #n. In some embodiments, the first device receives no other downlink assignment, other than the downlink assignment with counter DAI field value of 1, in the first set of occasions associated with the slot #n.

In some embodiments, the PDSCH reception comprises PDSCH reception and/or reception of PDCCH indicating SPS release.

In some embodiments, "only for a PDSCH reception scheduled by a downlink assignment" as used herein refers to "only for a PDSCH reception scheduled by a downlink assignment" and/or "only for reception of a PDCCH indicating SPS release".

Embodiment 3

A first device receives a SL grant from a network in a first slot. The first device performs a sidelink transmission based on the SL grant to a second device in a second slot.

In some embodiments, the first device receives a SL HARQ-ACK feedback, corresponding to the sidelink transmission, from the second device in a third slot. In some embodiments, the third slot may be different than the second slot. Alternatively and/or additionally, the third slot may be the same as the second slot.

In some embodiments, the first device is indicated, configured and/or instructed to transmit an indication for indicating a requirement for sidelink retransmission to the network in a fourth slot. The indication may be indicative of a requirement and/or a need for sidelink retransmission. For example, the indication may indicate that the first device is required to perform the sidelink retransmission. In some embodiments, the indication is the SL HARQ-ACK feedback (e.g., the indication comprises the SL HARQ-ACK feedback received from the second device). In some embodiments, the indication is derived/determined based on the SL HARQ-ACK feedback. In some embodiments, the indication is ACK if the SL HARQ-ACK feedback is ACK. In some embodiments, the indication is NACK if the SL HARQ-ACK feedback is NACK or DTX. In some embodiments, the indication is DTX if the SL HARQ-ACK feedback is NACK or DTX. In some embodiments, the first device is configured with a timing for transmitting the indication (e.g., the fourth slot). Alternatively and/or additionally, the timing is indicated to the first device. In some embodiments, the timing is indicated and/or configured via the SL grant. For example, the SL grant is indicative of the timing.

In some embodiments, for the fourth slot, the device is instructed, indicated and/or required by the network to transmit one or more HARQ-ACKs for one or more candidate PDSCH receptions (and/or one or more receptions of PDCCH indicating SPS release).

In some embodiments, the first device transmits the indication (e.g., the SL HARQ-ACK), and/or the one or more HARQ-ACKs on a first resource in the fourth slot.

In some embodiments, the first device determines a number of HARQ-ACK bits based on a first set of occasions (e.g., a first set of one or more occasions) and a second set of occasions (e.g., a second set of one or more occasions). In some embodiments, the first set of occasions is used to determine a first number of HARQ-ACK bits for one or more candidate PDSCH receptions (and/or one or more receptions of PDCCH indicating SPS release). In some embodiments, the second set of occasions is used to determine a second number of HARQ-ACK bits for the indication. In some embodiments, the second set of occasions is used to determine the second number of HARQ-ACK bits for SL HARQ-ACK (e.g., the second number of HARQ-ACK bits may correspond to a number of SL HARQ-ACK bits).

In some embodiments, the fourth slot is slot #n.

In some embodiments, the first device could be configured with a plurality of resource sets having up to a number of resource sets, wherein a resource set comprises at least one resource for transmitting one or more HARQ-ACKs.

In some embodiments, the first device receives a DCI indicating HARQ-ACK feedback in the fourth slot (e.g., slot #n) (e.g., the DCI may be indicative of transmission of HARQ-ACK feedback in the fourth slot). In some embodiments, the first device receives a DCI which is the last (received) DCI (e.g., most recently received DCI) in time domain, indicating HARQ-ACK feedback in the fourth slot (e.g., slot #n) (e.g., the DCI may be indicative of transmission of HARQ-ACK feedback in the fourth slot).

In some embodiments, the DCI indicates a resource offset (e.g., PRO) for generating a resource index.

In some embodiments, the first device determines the first resource based on the resource index and the number of HARQ-ACK bits and/or the first number of HARQ-ACK bits.

In some embodiments, the first device receives a first DCI which is the last received DCI in time domain (e.g., the first DCI is a most recently received DCI), which indicates transmission of one or more HARQ-ACKs (associated with Uu interface) to the network in the fourth slot. In some embodiments, the first DCI schedules PDSCH.

In some embodiments, the first DCI indicates a first resource offset (e.g., PRO) for generating a first resource index.

In some embodiments, the first device determines the first resource based on the first resource index and the number of HARQ-ACK bits and/or the first number of HARQ-ACK bits.

In some embodiments, the first device receives a second DCI which is the last received SL grant in time domain (e.g., the second DCI is a most recently received SL grant), which indicates transmission of one or more SL HARQ-ACKs to the network in the fourth slot. In some embodiments, the second DCI schedules one or more sidelink resources.

In some embodiments, the second DCI indicates a second resource offset (e.g., PRO) for generating a second resource index.

In some embodiments, the first device determines the first resource based on the second resource index and a number of SL HARQ-ACK bits, such as the second number of HARQ-ACK bits.

In some embodiments, a first counter DAI is used for counting one or more downlink assignments (and/or one or more SPS releases) indicating HARQ-ACK transmission in slot #n.

In some embodiments, a second counter DAI is used for counting one or more received SL grants which indicate SL HARQ-ACK transmission in slot #n.

In some embodiments, the first counter DAI indicates an accumulative number of downlink assignments (and/or SPS releases) indicating HARQ-ACK transmission in slot #n.

In some embodiments, the second counter DAI indicates an accumulative number of SL grants indicating SL HARQ-ACK transmission in slot #n.

In some embodiments, the second counter DAI does not count a SL grant (e.g., the second counter DAI is not determined based on the SL grant) if the SL grant does not indicate SL HARQ-ACK transmission in slot #n.

With respect to FIG. 7, in some embodiments, SL grant 1 (received in the time period 702) may be indicative of the second counter DAI being {1} and/or SL grant 2 (received in the time period 704, after the time period 702) may be indicative of the second counter DAI being {2}.

In some embodiments, the PDCCH 1 (received in time period 706) may be indicative of the first counter DAI being {1} and/or the PDCCH 2 (received in the time period 708, after the time period 706) may be indicative of the first counter DAI being {2}.

In some embodiments, in a scenario where the first device does not correctly receive (and/or does not receive) the SL grant 1, and the first device receives the SL grant 2 indicative of the second counter DAI being {2}, the first device may determine that there is a loss, such as an unsuccessful reception, before the SL grant 2 (e.g., the first device may determine the loss based on the second counter DAI being {2}).

FIG. 11 illustrates a table 1100 comprising UCI payload sizes (e.g., numbers of HARQ-ACK bits) for a single cell, for type-1 HARQ-ACK codebook.

In some embodiments, the first device may be configured with 8 different k1 values and 4 different k3 values. For example, k1 (e.g., the first plurality of slot offsets) may comprise 8 slot offsets (e.g., 8 k1 values) and/or k3 (e.g., the second plurality of slot offsets) may comprise 4 slot offsets (e.g., 4 k3 values). Alternatively and/or additionally, k1 may comprise a number of k1 values different than 8 and/or k3 may comprise a number of k3 values different than 4.

In some embodiments, a slot of slots #n-k1 (and/or each slot of slots #n-k1) generates and/or corresponds to one occasion.

In some embodiments, k1 comprising 8 k1 values (e.g., 8 slot offsets) may correspond to and/or may refer to 8 occasions for HARQ-ACK feedback. For example, slots #n-k1 may generate and/or correspond to 8 occasions for HARQ-ACK feedback.

In some embodiments, a slot of slots #n-k3 (and/or each slot of slots #n-k3) generates and/or corresponds to one occasion.

In some embodiments, k3 comprising 4 k3 values (e.g., 4 slot offsets) may correspond to and/or may refer to 4 occasions for transmitting received/derived/determined SL HARQ-ACK. For example, slots #n-k3 may generate and/or correspond to 4 occasions for transmitting received/derived/determined SL HARQ-ACK.

In some embodiments, in the table 1100, {0} in the top row denotes no downlink assignment indicating HARQ-ACK to slot #n (e.g., no downlink assignment indicative of HARQ-ACK transmission in slot #n is received by the first device).

In some embodiments, in the table 1100, {0} in the left hand column denotes no SL grant receptions indicating HARQ-ACK to slot #n (e.g., no SL grant receptions indicative of HARQ-ACK transmission in slot #n is received by the first device).

In some embodiments, in the table 1100, {1} (in the top row or the left hand column) denotes only one downlink assignment indicating HARQ-ACK to slot #n (where a counter DAI value indicated by the first counter DAI of the downlink assignment is {1}) or only one SL grant reception indicating HARQ-ACK to slot #n (where a counter DAI value indicated by the second counter DAI of the SL grant is {1}).

In some embodiments, in the table 1100, {1} in the top row denotes one downlink assignment indicating HARQ-ACK to slot #n (where a counter DAI value indicated by the first counter DAI of the downlink assignment is {1}) (e.g., only one downlink assignment indicative of HARQ-ACK transmission in slot #n is received by the first device, where a counter DAI value indicated by the first counter DAI of the downlink assignment is {1}).

In some embodiments, in the table 1100, {1} in the left hand column denotes one SL grant reception indicating HARQ-ACK to slot #n (where a counter DAI value indicated by the second counter DAI of the SL grant is {1}) (e.g., only one SL grant indicative of HARQ-ACK transmission in slot #n is received by the first device, where a counter DAI value indicated by the second counter DAI of the SL grant is {1}).

In some embodiments, in the table 1100, (1, X] in the top row denotes that the first device receives more than one and up to X downlink assignments (and/or SPS releases) indicating HARQ-ACK transmission in slot #n or that the first device receives only one downlink assignment (where a counter DAI value indicated by the first counter DAI of the downlink assignment is other than {1}) indicating HARQ-ACK transmission in slot #n.

In some embodiments, in the table 1100, (1, Y] in the left hand column denotes that the first device receives more than one and up to Y SL grants indicating SL HARQ-ACK transmission in slot #n or that the first device receives only one SL grant (where a counter DAI value indicated by the second counter DAI of the SL grant is other than {1}) indicating SL HARQ-ACK transmission in slot #n.

In the exemplary scenario of FIG. 7, X may be 8 and Y may be 4 for a single cell.

In some embodiments, the table 1100 may be extended to a scenario where the first device is configured with carrier aggregation and the first device generates a HARQ-ACK codebook for a configured and/or activated carrier and/or cell.

In some embodiments, for carrier aggregation, X is 8 multiplied by a number of cells (e.g., a number of configured and/or activated cells). For example, X may be equal to 8 multiplied by the number of cells in a scenario where the first device is configured with carrier aggregation.

In some embodiments, for carrier aggregation, Y is 4 multiplied by a number of cells (e.g., a number of configured and/or activated cells). For example, Y may be equal to 4 multiplied by the number of cells in a scenario where the first device is configured with carrier aggregation.

In some embodiments, if the first device receives only one downlink assignment (where a counter DAI value indicated by the first counter DAI of the downlink assignment is {1}) indicating HARQ-ACK transmission to slot #n and only one SL grant (where a counter DAI value indicated by the second counter DAI of the SL grant is {1}) indicating SL HARQ-ACK transmission to slot #n, the first device generates 2 bits for HARQ-ACK feedback (in slot #n), where the 2 bits comprises one-bit HARQ-ACK corresponding to the downlink assignment and one-bit SL HARQ-ACK. In some embodiments, the most significant bit of the 2 bits refers to the one-bit HARQ-ACK or the one-bit SL HARQ-ACK.

FIG. 12 illustrates a table 1200 comprising UCI payload sizes (e.g., numbers of HARQ-ACK bits) for a single cell, for type-1 HARQ-ACK codebook.

The table 1200 (and/or UCI payload sizes indicated by the table 1200) may be used as an alternative and/or in addition to the table 1100 (and/or UCI payload sizes indicated by the table 1100).

In some embodiments, one or more HARQ-ACK bits, having a first number of HARQ-ACK bits, is generated by the first device, where the one or more HARQ-ACK bits comprise HARQ-ACK associated with Uu interface and SL HARQ-ACK. The first number of HARQ-ACK bits may be fixed and/or configured.

The table 1200 provides for two different payload sizes for HARQ-ACK feedback in slot #n (e.g., 2-bit payload size and 12-bit payload size).

In some embodiments, if the first device receives only one downlink assignment (where a counter DAI value indicated by the first counter DAI of the downlink assignment is {1}) and/or only one SL grant (where a counter DAI value indicated by the second counter DAI of the SL grant is {1}), the first device generates 2 bits for HARQ-ACK feedback in slot #n, where the 2 bits comprises one-bit HARQ-ACK corresponding to the downlink assignment and one-bit SL HARQ-ACK. In some embodiments, the most significant bit of the 2 bits refers to the one-bit HARQ-ACK or the one-bit SL HARQ-ACK. In some embodiments, in a scenario where the first device receives only one downlink assignment (where a counter DAI value indicated by the first counter DAI of the downlink assignment is {1}) and no SL grant reception, the 2 bits comprises the one-bit HARQ-ACK and the other one bit could be NACK. In some embodiments, the other bit is ignored by the network. In some embodiments, in a scenario where the first device receives only one SL grant (where a counter DAI value indicated by the second counter DAI of the SL grant is {1}) and no downlink assignment reception, the 2 bits comprises the one-bit SL HARQ-ACK and the other one bit could be NACK. In some embodiments, the other bit is ignored by the network.

In some embodiments, the first device is configured with two counter DAIs, wherein a first counter DAI is used for counting an accumulative number of downlink assignments indicating HARQ-ACK transmission in slot #n and a second counter DAI is used for counting an accumulative number of SL grants indicating transmitting received/derived/determined SL HARQ-ACK(s) in slot #n.

In some embodiments, the first device is configured with a first set of occasions for candidate PDSCH receptions.

In some embodiments, the first device is configured with a second set of occasions for candidate SL grant reception.

In some embodiments, the first device is indicated by a network to transmit one or more HARQ-ACKs corresponding to a first set of occasions for candidate PDSCH receptions in slot #n.

In some embodiments, the first device is indicated by the network to transmit one or more SL HARQ-ACKs to the network in slot #n, wherein the one or more SL HARQ-ACKs correspond to one or more sidelink transmissions scheduled by one or more SL grants received in a second set of occasions for candidate SL grant reception.

In some embodiments, the first device determines a first number associated with the one or more HARQ-ACKs (e.g., a first number of HARQ-ACKs of the one or more HARQ-ACKs and/or a first number of bits of the one or more HARQ-ACKs) based on whether the first device receives only a PDSCH reception scheduled by a downlink assignment with counter DAI field value of 1 indicated by a first counter DAI within the first set of occasions. In some embodiments, the first device does not receive other PDSCH, other than the PDSCH reception scheduled by the downlink assignment with counter DAI field value of 1 indicated by the first counter DAI, within the first set of occasions.

In some embodiments, the first device determines a second number associated with the one or more SL HARQ-ACKs (e.g., a second number of SL HARQ-ACKs of the one or more SL HARQ-ACKs and/or a second number of bits of the one or more SL HARQ-ACKs) based on whether the first devices receives only a SL grant with counter DAI field value of 1 indicated by the second counter DAI within the second set of occasions. In some embodiments, the first device does not receive other SL grant, other than the SL grant scheduled by the downlink assignment with counter DAI field value of 1 indicated by the second counter DAI, within the second set of occasions.

In some embodiments, in slot #n, the first device transmits one or more HARQ-ACKs based on the first number and/or one or more SL HARQ-ACKs based on the second number on a resource. For example, in slot #n, the first device transmits one or more HARQ-ACKs having the first number of HARQ-ACKs and one or more SL HARQ-ACKs having the second number of SL HARQ-ACKs on a resource. Alternatively and/or additionally, in slot #n, the first device transmits one or more HARQ-ACKs having the first number of bits and one or more SL HARQ-ACKs having the second number of bits on a resource.

In some embodiments, the PDSCH reception comprises PDSCH reception and/or reception of PDCCH indicating SPS release.

In some embodiments, "only for a PDSCH reception scheduled by a downlink assignment" as used herein refers to "only for a PDSCH reception scheduled by a downlink assignment" and/or "only for reception of a PDCCH indicating SPS release".

One, some and/or all of the foregoing concepts and/or embodiments can be formed to a new embodiment.

In some examples, each of the embodiments disclosed herein, such as Embodiment 1, Embodiment 2 and Embodiment 3, may be implemented independently and/or separately. Alternatively and/or additionally, a combination of two or more of the embodiments disclosed herein, such as Embodiment 1, Embodiment 2 and/or Embodiment 3, may be implemented. Alternatively and/or additionally, a combination of two or more of the embodiments disclosed herein, such as Embodiment 1, Embodiment 2 and/or Embodiment 3, may be implemented concurrently and/or simultaneously.

Various techniques of the present disclosure may be performed independently and/or separately from one another. Alternatively and/or additionally, various techniques of the present disclosure may be combined and/or implemented using a single system. Alternatively and/or additionally, various techniques of the present disclosure may be implemented concurrently and/or simultaneously.

Figure 13:
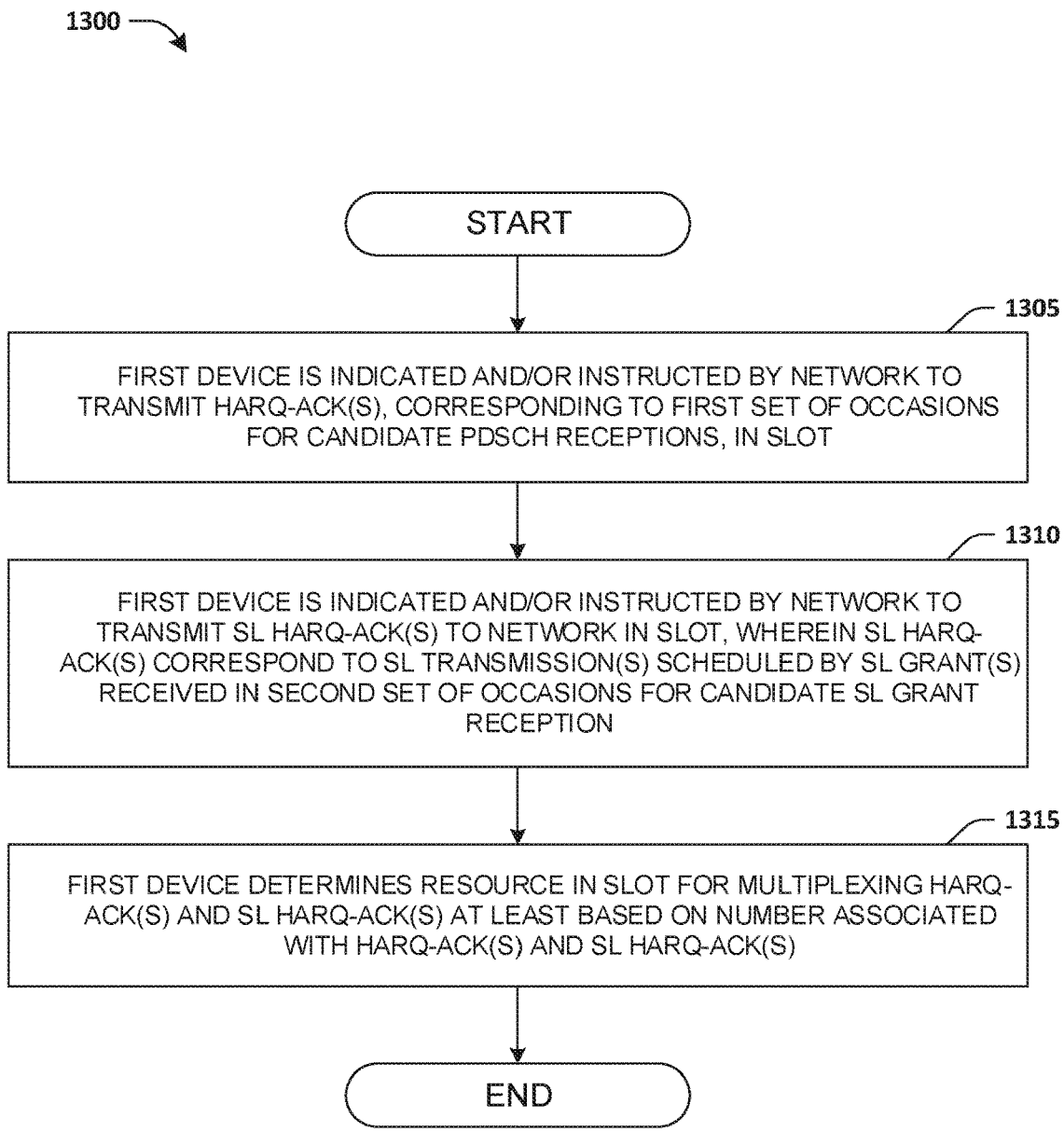
FIG. 13 is a flow chart according to one exemplary embodiment.

FIG. 13 is a flow chart 1300 according to one exemplary embodiment from the perspective of a first device for performing sidelink communication in network scheduling mode (e.g., NR V2X/SL mode 1). In step 1305, the first device is indicated and/or instructed by a network to transmit one or more HARQ-ACKs, corresponding to a first set of occasions for candidate PDSCH receptions, in a slot (e.g., the first device may be indicated and/or instructed by the network to transmit the one or more HARQ-ACKs to the network). In step 1310, the first device is indicated and/or instructed by the network to transmit one or more SL HARQ-ACKs to the network in the slot, wherein the one or more SL HARQ-ACKs correspond to one or more sidelink transmissions scheduled by one or more SL grants, wherein the one or more SL grants are received in a second set of occasions for candidate SL grant reception. In step 1315, the first device determines a resource in the slot for multiplexing the one or more HARQ-ACKs and the one or more SL HARQ-ACKs at least based on a number associated with the one or more HARQ-ACKs and the one or more SL HARQ-ACKs. If the first device reports (and/or transmits) one or more HARQ-ACKs and/or one or more SL HARQ-ACKs only for a SL grant (with counter DAI field value of 1) within the second set of occasions or only for a PDSCH reception scheduled by a downlink assignment (with counter DAI field value of 1) within the first set of occasions, the number is 1, otherwise, the number is a cardinality of the first set of occasions plus a cardinality of the second set of occasions.

In one embodiment, a SL grant indicates a counter DAI value.

In one embodiment, a downlink assignment indicates a counter DAI value.

In one embodiment, a counter DAI indicates an accumulative number of downlink assignments scheduling PDSCHs in the first set of occasions and/or SL grants in the second set of occasions.

In one embodiment, the resource is determined based on a last received SL grant or downlink assignment in time domain (e.g., most recently received SL grant or downlink assignment) indicating and/or instructing the first device to transmit HARQ-ACK in the slot.

In one embodiment, a SL grant with counter DAI field value of 1 within the second set of occasions is on a PCell.

In one embodiment, a downlink assignment with counter DAI field value of 1 within the first set of occasions is on the PCell.

In one embodiment, the first device is configured (with) a semi-static HARQ-ACK codebook.

In one embodiment, the number associated with the one or more HARQ-ACKs corresponds to a number of bits of the one or more HARQ-ACK and the one or more SL HARQ-ACKs.

In one embodiment, the number associated with the one or more HARQ-ACKs corresponds to a number of HARQ-ACKs of the one or more HARQ-ACKs and the one or more SL HARQ-ACKs.

Referring back to FIGS. 3 and 4, in one exemplary embodiment of a first device, the device 300 includes a program code 312 stored in the memory 310. The CPU 308 could execute program code 312 to enable the first device (i) to be indicated and/or instructed by a network to transmit one or more HARQ-ACKs corresponding to a first set of occasions for candidate PDSCH receptions in a slot, (ii) to be indicated and/or instructed by the network to transmit one or more SL HARQ-ACKs to the network in the slot, wherein the one or more SL HARQ-ACKs correspond to one or more sidelink transmissions scheduled by one or more SL grants received in a second set of occasions for candidate SL grant reception, and (iii) to determine a resource in the slot for multiplexing the one or more HARQ-ACKs and the one or more SL HARQ-ACKs at least based on a number associated with the one or more HARQ-ACKs and the one or more SL HARQ-ACKs. Furthermore, the CPU 308 can execute the program code 312 to perform one, some and/or all of the above-described actions and steps and/or others described herein.

Figure 14:
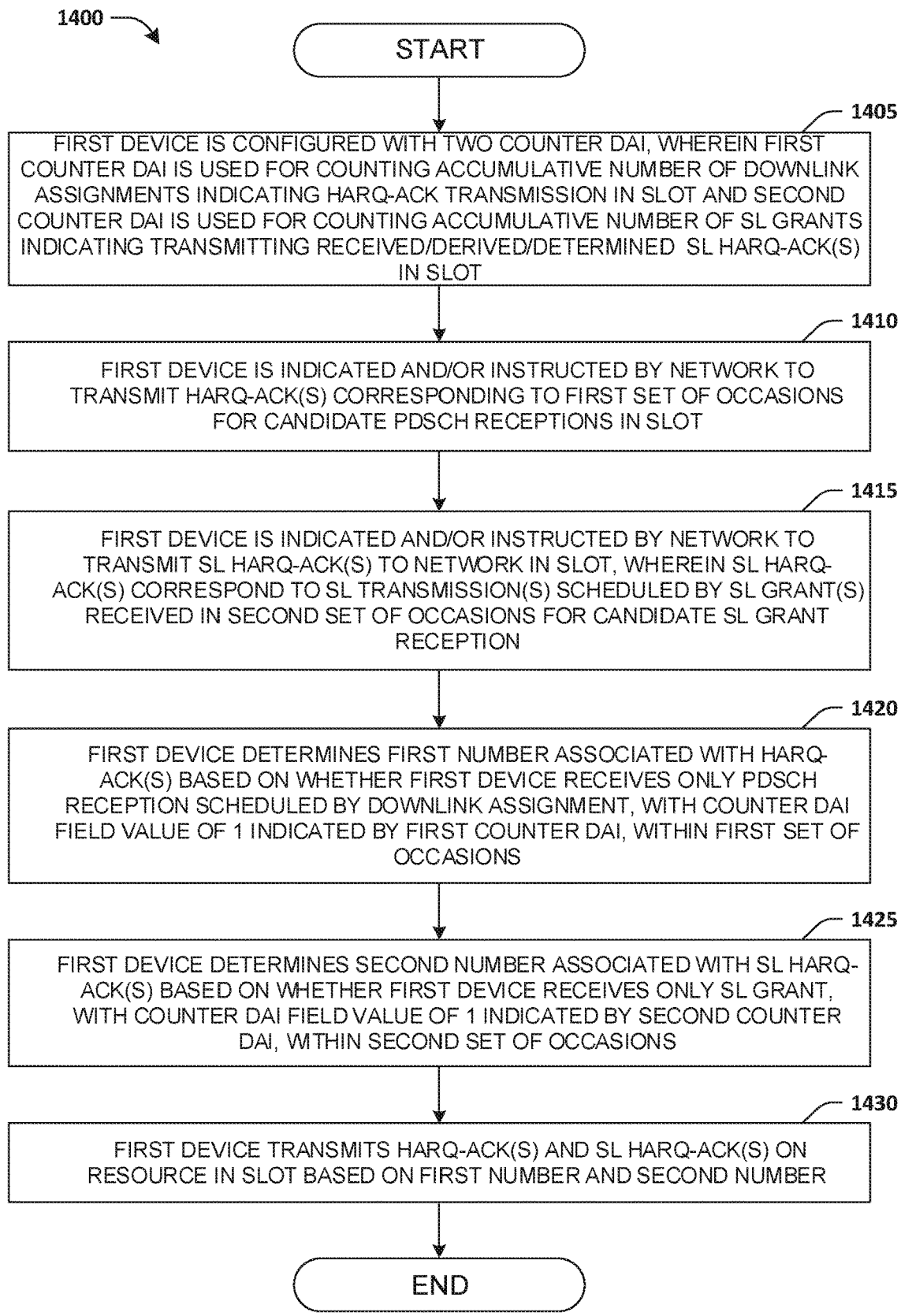
FIG. 14 is a flow chart according to one exemplary embodiment.

FIG. 14 is a flow chart 1400 according to one exemplary embodiment from the perspective of a first device in V2X network scheduling mode. In step 1405, the first device is configured with two counter DAIs, wherein a first counter DAI (of the two counter DAIs) is used for counting an accumulative number of downlink assignments indicating HARQ-ACK transmission in a slot and a second counter DAI (of the two counter DAIs) is used for counting an accumulative number of SL grants indicating transmitting one or more received/derived/determined SL HARQ-ACKs in the slot. In step 1410, the first device is indicated and/or instructed by a network to transmit one or more HARQ-ACKs corresponding to a first set of occasions for candidate PDSCH receptions in a slot. In step 1415, the first device is indicated and/or instructed by the network to transmit one or more SL HARQ-ACKs to the network in the slot, wherein the one or more SL HARQ-ACKs correspond to one or more sidelink transmissions scheduled by one or more SL grants received in a second set of occasions for candidate SL grant reception. In step 1420, the first device determines a first number associated with the one or more HARQ-ACKs based on whether the first device receives only a PDSCH reception (e.g., a single PDSCH reception) scheduled by a downlink assignment, with a counter DAI field value of 1 indicated by the first counter DAI, within the first set of occasions (e.g., the counter DAI field value of 1 may be indicated by an indication of the first counter DAI in the downlink assignment). In step 1425, the first device determines a second number associated with the one or more SL HARQ-ACKs based on whether the first device receives only a SL grant (e.g., a single SL grant), with counter DAI field value of 1 indicated by the second counter DAI within the second set of occasions (e.g., the counter DAI field value of 1 may be indicated by an indication of the second counter DAI in the SL grant). In step 1430, the first device transmits the one or more HARQ-ACKs and the one or more SL HARQ-ACKs on a resource in the slot based on the first number and the second number. In an example, the first number corresponds to a number of HARQ-ACKs of the one or more HARQ-ACKs and/or the second number corresponds to a number of SL HARQ-ACKs of the one or more SL HARQ-ACKs. For example, the first device may transmit the one or more HARQ-ACKs having the first number of HARQ-ACKs and/or the one or more SL HARQ-ACKs having the second number of HARQ-ACKs. In an example, the first number corresponds to a number of HARQ-ACK bits of the one or more HARQ-ACKs and/or the second number corresponds to a number of SL HARQ-ACK bits of the one or more SL HARQ-ACKs. For example, the first device may transmit the one or more HARQ-ACKs having the first number of HARQ-ACK bits and/or the one or more SL HARQ-ACKs having the second number of HARQ-ACK bits. In some embodiments, the resource is determined based upon the first number and the second number.

In one embodiment, the resource is determined based on a last received SL grant or downlink assignment in time domain (e.g., most recently received SL grant or downlink assignment) indicating and/or instructing the first device to transmit HARQ-ACK in the slot.

In one embodiment, the downlink assignment, with the counter DAI field value of 1 indicated by the first counter DAI, within the first set of occasions is on a PCell.

In one embodiment, the SL grant, with the counter DAI field value of 1 indicated by the second counter DAI, within the second set of occasions is on the PCell.

In one embodiment, the first device is configured (with) a semi-static HARQ-ACK codebook.

Referring back to FIGS. 3 and 4, in one exemplary embodiment of a first device, the device 300 includes a program code 312 stored in the memory 310. The CPU 308 could execute program code 312 to enable the first device (i) to be configured with two counter DAIs, wherein a first counter DAI is used for counting an accumulative number of downlink assignments indicating HARQ-ACK transmission in a slot and a second counter DAI is used for counting an accumulative number of SL grants indicating transmitting one or more received/derived/determined SL HARQ-ACKs in the slot, (ii) to be indicated and/or instructed by a network to transmit one or more HARQ-ACKs corresponding to a first set of occasion for candidate PDSCH receptions in a slot, (iii) to be indicated and/or instructed by the network to transmit one or more SL HARQ-ACKs to the network in the slot, wherein the one or more SL HARQ-ACKs correspond to one or more sidelink transmissions scheduled by one or more SL grants received in a second set of occasions for candidate SL grant reception, (iv) to determine a first number associated with the one or more HARQ-ACKs based on whether the first device receives only a PDSCH reception scheduled by a downlink assignment, with a counter DAI field value of 1 indicated by the first counter DAI, within the first set of occasions, (v) to determine a second number associated with the one or more SL HARQ-ACKs based on whether the first device receives only a SL grant, with a counter DAI field value of 1 indicated by the second counter DAI, within the second set of occasions, and (vi) to transmit the one or more HARQ-ACKs and the one or more SL HARQ-ACKs on a resource in the slot based on the first number and the second number. Furthermore, the CPU 308 can execute the program code 312 to perform one, some and/or all of the above-described actions and steps and/or others described herein.

Figure 15:
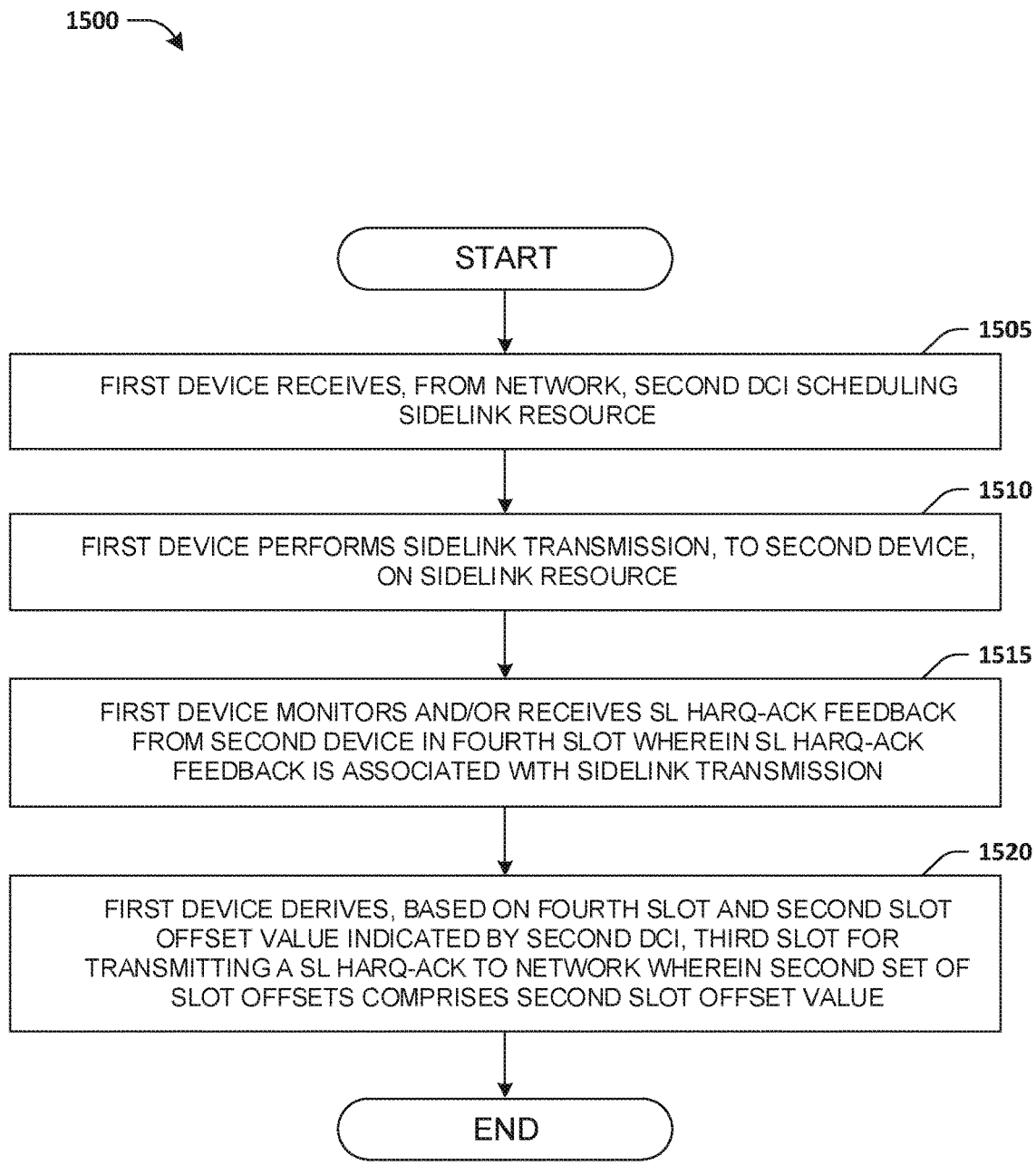
FIG. 15 is a flow chart according to one exemplary embodiment.

FIG. 15 is a flow chart 1500 according to one exemplary embodiment from the perspective of a first device in sidelink network scheduling mode. The first device is configured a second set of slot offsets by a network. In step 1505, the first device receives, from the network, a second DCI scheduling a sidelink resource. In step 1510, the first device performs sidelink transmission, to a second device, on the sidelink resource. In step 1515, the first device monitors (e.g., monitors for) and/or receives a SL HARQ-ACK feedback from the second device in a fourth slot. The SL HARQ-ACK feedback is associated with the sidelink transmission. In step 1520, the first device derives, based on the fourth slot and a second slot offset value indicated by the second DCI, a third slot for transmitting a SL HARQ-ACK to the network. The SL HARQ-ACK is set/derived/determined based on the received SL HARQ-ACK feedback. The second set of slot offsets comprises the second slot offset value (e.g., the second slot offset value is among the second set of slot offsets and/or the second DCI indicates the second slot offset value among the second set of slot offsets).

In one embodiment, the second slot offset value is referred to the fourth slot. In an example, the second slot offset value corresponds to an offset from the fourth slot to the third slot. In an example, one or more operations (e.g., mathematical operations) may be performed using the second slot offset value and the fourth slot to derive the third slot.

In one embodiment, the second DCI is indicative of a value of a second counter DAI. The second counter DAI corresponds to a count of one or more DCIs that schedule one or more sidelink resources and that are indicative of the third slot (and/or that are indicative of a same slot for transmitting the SL HARQ-ACK to the network). For example, the second counter DAI counts (and/or is used to count) an accumulative number of DCIs that schedule one or more sidelink resources and that are indicative of the third slot. Alternatively and/or additionally, the second counter DAI determines (and/or is used to determine) an accumulative number of DCIs that schedule one or more sidelink resources and that are indicative of the third slot.

In one embodiment, the first device receives, from the network, one or more second DCIs scheduling one or more sidelink resources. The first device performs one or more sidelink transmissions on the one or more sidelink resources. The one or more second DCIs are indicative of the third slot for transmitting one or more SL HARQ-ACKs to the network. The one or more SL HARQ-ACKs have a second number of SL HARQ-ACK bits and are associated with the one or more sidelink transmissions.

In one embodiment, the one or more second DCIs comprise the second DCI and/or the one or more sidelink transmissions comprise the sidelink transmission to the second device.

In one embodiment, each DCI of the one or more second DCIs is indicative of a value of a second counter DAI. The second counter DAI corresponds to a count of one or more DCIs that schedule one or more sidelink resources and that are indicative of the third slot for transmitting one or more SL HARQ-ACKs to the network. For example, the second counter DAI counts (and/or is used to count) an accumulative number of DCIs that schedule one or more sidelink resources and that are indicative of the third slot. Alternatively and/or additionally, the second counter DAI determines (and/or is used to determine) an accumulative number of DCIs that schedule one or more sidelink resources and that are indicative of the third slot.

In one embodiment, the first device derives the second number of SL HARQ-ACK bits based on the second counter DAI and/or an indication, of a value of the second counter DAI, in a last received DCI of the one or more second DCIs. For example, the first device derives the second number of SL HARQ-ACK bits based on the second counter DAI and/or a value of the second counter DAI that is indicated in a last received DCI (e.g., a most recently received DCI) of the one or more second DCIs.

In one embodiment, the first device derives the second number of SL HARQ-ACK bits based on a cardinality of the second set of slot offsets.

In one embodiment, the first device transmits the one or more SL HARQ-ACKs in an uplink resource in the third slot. For example, the one or more SL HARQ-ACKs may be multiplexed in the uplink resource in the third slot. For example, the first device may transmit the one or more SL HARQ-ACKs by multiplexing the one or more SL HARQ- ACKs in the uplink resource in the third slot. Alternatively and/or additionally, the uplink resource is derived based on a last received DCI (e.g., a most recently received DCI) of the one or more second DCIs. For example, the uplink resource may be derived based on a last received DCI (e.g., a most recently received DCI) of one or more DCIs that schedule one or more sidelink resources and that are indicative of the third slot.

In one embodiment, the first device receives a first DCI scheduling a PDSCH, wherein the first DCI is indicative of a first slot offset value. The first device derives a first slot for transmitting HARQ-ACK associated with the PDSCH based on the first slot offset value.

In one embodiment, the first device is configured with a first set of slot offsets by the network and/or the first set of slot offsets comprises the first slot offset value (e.g., the first slot offset value is among the first set of slot offsets).

In one embodiment, the first DCI is received in a second slot. The first slot is derived for transmitting HARQ-ACK based on first slot offset value and the second slot (e.g., the first slot offset value is referred to the second slot within which the first device receives the PDSCH). In an example, the first slot offset value corresponds to an offset from the second slot to the first slot. In an example, one or more operations (e.g., mathematical operations) may be performed using the first slot offset value and the second slot to derive the first slot.

In one embodiment, the first DCI is indicative of a value of a first counter DAI. The first counter DAI corresponds to a count of one or more DCIs that schedule one or more PDSCHs and that are indicative of the first slot (and/or that are indicative of a same slot for transmitting the HARQ-ACK to the network). For example, the first counter DAI counts (and/or is used to count) an accumulative number of DCIs that schedule one or more PDSCHs and that are indicative of the first slot. Alternatively and/or additionally, the first counter DAI determines (and/or is used to determine) an accumulative number of DCIs that schedule one or more PDSCHs and that are indicative of the first slot.

In one embodiment, the first device receives, from the network, one or more first DCIs scheduling one or more PDSCHs. The one or more first DCIs are indicative of the first slot for transmitting one or more HARQ-ACKs to the network. The one or more HARQ-ACKs have a first number of HARQ-ACK bits and are associated with the one or more PDSCHs.

In one embodiment, the one or more first DCIs comprise the first DCI.

In one embodiment, each DCI of the one or more first DCIs is indicative of a value of a first counter DAI. The first counter DAI corresponds to a count of one or more DCIs that schedule one or more PDSCHs and that are indicative of the first slot. For example, the first counter DAI counts (and/or is used to count) an accumulative number of DCIs that schedule one or more PDSCHs and that are indicative of the first slot. Alternatively and/or additionally, the first counter DAI determines (and/or is used to determine) an accumulative number of DCIs that schedule one or more PDSCHs and that are indicative of the first slot.

In one embodiment, the first device derives the first number of HARQ-ACK bits based on the first counter DAI and/or a cardinality of the first set of slot offsets. Alternatively and/or additionally, the first device derives the first number of HARQ-ACK bits based on the cardinality of the first set of slot offsets and/or an indication, of a value of the first counter DAI, in a last received DCI of the one or more first DCIs (e.g., a most recently received DCI of the one or more first DCIs).

In one embodiment, the first DCI is indicative of a value of a first counter DAI. The first counter DAI corresponds to a count of one or more DCIs that schedule one or more PDSCHs and that are indicative of the first slot, wherein the second DCI is indicative of a value of a second counter DAI, the second counter DAI corresponds to a count of one or more DCIs that schedule one or more sidelink resources and are indicative of the third slot, and the first counter DAI and the second counter DAI are counted independently. Alternatively and/or additionally, the first slot is the same as the third slot and the first counter DAI corresponds to a count of one or more DCIs that at least one of schedule one or more sidelink resources and are indicative of the third slot, or schedule one or more PDSCHs and are indicative of the third slot.

In one embodiment, the second number of SL HARQ-ACK bits corresponds to one bit if (and/or when) the one or more second DCIs comprises merely the second DCI (e.g., the second DCI is the only received DCI of the one or more second DCIs) and a value of the second counter DAI, indicated by the second DCI, is one.

In one embodiment, the second number of SL HARQ-ACK bits corresponds to a cardinality of the second set of slot offsets or a value of the second counter DAI if (and/or when) at least one of the one or more second DCIs comprise more than one DCI and/or a value of the second counter DAI, indicated by the second DCI, is greater than one.

In one embodiment, the first slot is the same as the third slot. The first device may generate a UCI payload. The UCI payload comprises one or more first bits, having the first number of HARQ-ACK bits, indicative of the one or more HARQ-ACKs. The UCI payload comprises one or more second bits, having the second number of SL HARQ-ACK bits, indicative of the one or more SL HARQ-ACKs. The one or more first bits are followed by and/or concatenated by the one or more second bits (in the UCI payload). An uplink resource may be derived based on a last received DCI (e.g., a most recently received DCI) of the one or more first DCIs and the one or more second DCIs (e.g., the last received DCI may correspond to a most recently received DCI that at least one of schedules one or more PDSCHs and is indicative of the third slot, or schedules one or more sidelink resources and is indicative of the third slot). Alternatively and/or additionally, the UCI payload may be transmitted in the uplink resource in the third slot.

Referring back to FIGS. 3 and 4, in one exemplary embodiment of a first device configured with a second set of slot offsets by a network, the device 300 includes a program code 312 stored in the memory 310. The CPU 308 could execute program code 312 to enable the first device (i) to receive, from the network, a second DCI scheduling a sidelink resource, (ii) to perform sidelink transmission, to a second device, on the sidelink resource, (iii) to monitor and/or receive a SL HARQ-ACK feedback from the second device in a fourth slot, wherein the SL HARQ-ACK feedback is associated with the sidelink transmission, and (iv) to derive, based on the fourth slot and a second slot offset value indicated by the second DCI, a third slot for transmitting a SL HARQ-ACK to the network, wherein the second set of slot offsets comprises the second slot offset value. The SL HARQ-ACK is set/derived/determined based on the received SL HARQ-ACK feedback. Furthermore, the CPU 308 can execute the program code 312 to perform one, some and/or all of the above-described actions and steps and/or others described herein.

A communication device (e.g., a UE, a base station, a network node, etc.) may be provided, wherein the communication device may comprise a control circuit, a processor installed in the control circuit and/or a memory installed in the control circuit and coupled to the processor. The processor may be configured to execute a program code stored in the memory to perform method steps illustrated in one or more of FIGS. 13-15. Furthermore, the processor may execute the program code to perform one, some and/or all of the above-described actions and steps and/or others described herein.

Various aspects of the disclosure have been described above. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. As an example of some of the above concepts, in some aspects concurrent channels may be established based on pulse repetition frequencies. In some aspects concurrent channels may be established based on pulse position or offsets. In some aspects concurrent channels may be established based on time hopping sequences. In some aspects concurrent channels may be established based on pulse repetition frequencies, pulse positions or offsets, and time hopping sequences.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Alternatively and/or additionally, in some aspects any suitable computer-program product may comprise a computer-readable medium comprising codes relating to one or more of the aspects of the disclosure. In some aspects a computer program product may comprise packaging materials.

While the disclosed subject matter has been described in connection with various aspects, it will be understood that the disclosed subject matter is capable of further modifications. This application is intended to cover any variations, uses or adaptation of the disclosed subject matter following, in general, the principles of the disclosed subject matter, and including such departures from the present disclosure as come within the known and customary practice within the art to which the disclosed subject matter pertains.

The invention claimed is:

1. A method of a first device, in Sidelink network scheduling mode, configured with a second set of slot offsets by a network, wherein each value in the second set of slot offsets indicates a slot offset from a slot for receiving sidelink hybrid automatic repeat request-acknowledgement (SL HARQ-ACK) feedback corresponding to a sidelink transmission to a slot for transmitting to the network at least one SL HARQ-ACK that is at least one of set, derived or determined, the method comprising:
  receiving, from the network, a second Downlink Control Information (DCI) scheduling a sidelink resource;
  performing a sidelink transmission, to a second device, on the sidelink resource;
  monitoring or receiving a SL HARQ-ACK feedback from the second device in a fourth slot, wherein the SL HARQ-ACK feedback is associated with the sidelink transmission to the second device; and
  deriving, based on the fourth slot and a second slot offset value indicated by the second DCI, a third slot for transmitting a SL HARQ-ACK to the network, wherein the second set of slot offsets comprises the second slot offset value, and wherein the SL HARQ-ACK is at least one of set, derived or determined based on the received SL HARQ-ACK feedback.

2. The method of claim 1, wherein:
  the second DCI is indicative of a value of a second counter Downlink Assignment Index (DAI); and
  the second counter DAI corresponds to a count of one or more DCIs that schedule one or more sidelink resources and that are indicative of the third slot.

3. The method of claim 1, comprising:
  receiving, from the network, one or more second DCIs scheduling one or more sidelink resources; and
  performing one or more sidelink transmissions on the one or more sidelink resources, wherein the one or more second DCIs are indicative of the third slot for transmitting one or more SL HARQ-ACKs to the network, and wherein the one or more SL HARQ-ACKs have a second number of SL HARQ-ACK bits and are associated with the one or more sidelink transmissions.

4. The method of claim 3, wherein:
  the receiving the one or more second DCIs comprises the receiving the second DCI; and
  the performing the one or more sidelink transmissions comprises the performing the sidelink transmission to the second device.

5. The method of claim 3, wherein:
  each DCI of the one or more second DCIs is indicative of a value of a second counter Downlink Assignment Index (DAI); and
  the second counter DAI corresponds to a count of one or more DCIs that schedule one or more sidelink resources and that are indicative of the third slot for transmitting one or more SL HARQ-ACKs to the network.

6. The method of claim 5, comprising:
  deriving the second number of SL HARQ-ACK bits based on at least one of:
    the second counter DAI; or
    an indication, of a value of the second counter DAI, in a last received DCI of the one or more second DCIs.

7. The method of claim 3, comprising:
  deriving the second number of SL HARQ-ACK bits based on a cardinality of the second set of slot offsets.

8. The method of claim 3, comprising at least one of:
  transmitting the one or more SL HARQ-ACKs in an uplink resource in the third slot; or
  deriving the uplink resource based on a last received DCI of the one or more second DCIs.

9. The method of claim 1, comprising:
  receiving a first DCI scheduling a Physical Downlink Shared Channel (PDSCH), wherein the first DCI is indicative of a first slot offset value; and
  deriving a first slot for transmitting hybrid automatic repeat request-acknowledgement (HARQ-ACK) associated with the PDSCH based on the first slot offset value.

10. The method of claim 9, wherein at least one of:
  the first device is configured with a first set of slot offsets by the network; or
  the first set of slot offsets comprises the first slot offset value.

11. The method of claim 9, wherein:
  the receiving the first DCI is performed in a second slot; and
  the deriving the first slot is performed based on the second slot.

12. The method of claim 9, wherein
  the first DCI is indicative of a value of a first counter Downlink Assignment Index (DAI); and
  the first counter DAI corresponds to a count of one or more DCIs that schedule one or more PDSCHs and that are indicative of the first slot.

13. The method of claim 9, comprising:
  receiving, from the network, one or more first DCIs scheduling one or more PDSCHs, wherein the one or more first DCIs are indicative of the first slot for transmitting one or more HARQ-ACKs to the network, and wherein the one or more HARQ-ACKs have a first number of HARQ-ACK bits and are associated with the one or more PDSCHs.

14. The method of claim 13, wherein:
  the receiving the one or more first DCIs comprises the receiving the first DCI.

15. The method of claim 13, wherein:
  each DCI of the one or more first DCIs is indicative of a value of a first counter Downlink Assignment Index (DAI); and
  the first counter DAI corresponds to a count of one or more DCIs that schedule one or more PDSCHs and that are indicative of the first slot.

16. The method of claim 15, comprising:
  deriving the first number of HARQ-ACK bits based on at least one of:
    at least one of the first counter DAI or a cardinality of the first set of slot offsets; or
    at least one of the cardinality of the first set of slot offsets or an indication, of a value of the first counter DAI, in a last received DCI of the one or more first DCIs.

17. The method of claim 9, wherein:
  the first DCI is indicative of a value of a first counter Downlink Assignment Index (DAI); and
  at least one of:
    the first counter DAI corresponds to a count of one or more DCIs that schedule one or more PDSCHs and that are indicative of the first slot wherein:
      the second DCI is indicative of a value of a second counter DAI;
      the second counter DAI corresponds to a count of one or more DCIs that schedule one or more sidelink resources and are indicative of the third slot; and
      the first counter DAI and the second counter DAI are counted independently; or the first slot is the same as the third slot and the first counter DAI corresponds to a count of one or more DCIs that at least one of:
- schedule one or more sidelink resources and are indicative of the third slot; or
- schedule one or more PDSCHs and are indicative of the third slot.

18. The method of claim 6, wherein:
the second number of SL HARQ-ACK bits corresponds to one bit if the one or more second DCIs comprises merely the second DCI and a value of the second counter DAI, indicated by the second DCI, is one.

19. The method of claim 5, wherein:
the second number of SL HARQ-ACK bits corresponds to a cardinality of the second set of slot offsets or a value of the second counter DAI if at least one of the one or more second DCIs comprise more than one DCI or a value of the second counter DAI, indicated by the second DCI, is greater than one.

20. The method of claim 13, wherein the first slot is the same as the third slot, the method comprising:
receiving, from the network, one or more second DCIs scheduling one or more sidelink resources;
performing one or more sidelink transmissions on the one or more sidelink resources, wherein the one or more second DCIs are indicative of the third slot for transmitting one or more SL HARQ-ACKs to the network, wherein the one or more SL HARQ-ACKs have a second number of SL HARQ-ACK bits and are associated with the one or more sidelink transmissions;
generating an Uplink Control Information (UCI) payload comprising:
- one or more first bits, having the first number of HARQ-ACK bits, indicative of the one or more HARQ-ACKs; and
- one or more second bits, having the second number of SL HARQ-ACK bits, indicative of the one or more SL HARQ-ACKs, wherein the one or more first bits are at least one of followed by or concatenated by the one or more second bits; and at least one of:
- deriving an uplink resource based on a last received DCI of the one or more first DCIs and the one or more second DCIs; or
- transmitting the UCI payload in the uplink resource in the third slot.

21. A method of a network, the method comprising:
configuring a first device with a second set of slot offsets, wherein each value in the second set of slot offsets indicates a slot offset from a slot for at least one sidelink hybrid automatic repeat request-acknowledgement (SL HARQ-ACK) feedback corresponding to a sidelink transmission to a slot for receiving at least one SL HARQ-ACK from the first device;
transmitting, to the first device, a second Downlink Control Information (DCI) scheduling a sidelink resource; and
receiving a SL HARQ-ACK on a third slot from the first device, wherein the third slot is derived based on a fourth slot and a second slot offset value indicated by the second DCI, and wherein the second set of slot offsets comprises the second slot offset value, and wherein the fourth slot is a slot for a SL HARQ-ACK feedback associated with a sidelink transmission in the sidelink resource.

22. The method of claim 21, wherein:
the second DCI is indicative of a value of a second counter Downlink Assignment Index (DAI); and
the second counter DAI corresponds to a count of one or more DCIs that schedule one or more sidelink resources and that are indicative of the third slot.

23. The method of claim 21, comprising:
transmitting, to the first device, one or more second DCIs scheduling one or more sidelink resources, wherein the one or more second DCIs are indicative of the third slot, wherein the third slot is associated with receiving one or more SL HARQ-ACKs from the first device, and wherein the one or more SL HARQ-ACKs have a second number of SL HARQ-ACK bits.

24. The method of claim 23, wherein:
each DCI of the one or more second DCIs is indicative of a value of a second counter Downlink Assignment Index (DAI); and
the second counter DAI corresponds to a count of one or more DCIs that schedule one or more sidelink resources and that are indicative of the third slot.

25. The method of claim 24, wherein the second number of SL HARQ-ACK bits is based on at least one of:
the second counter DAI; or
an indication, of a value of the second counter DAI, in a last received DCI of the one or more second DCIs.

26. The method of claim 23, wherein the second number of SL HARQ-ACK bits is based on a cardinality of the second set of slot offsets.

27. The method of claim 23, comprising:
receiving the one or more SL HARQ-ACKs in an uplink resource in the third slot.

* * * * *